US011534266B2

United States Patent
Grove et al.

(10) Patent No.: US 11,534,266 B2
(45) Date of Patent: Dec. 27, 2022

(54) CREATING A DIGITAL DENTAL MODEL OF A PATIENT'S TEETH USING INTERPROXIMAL INFORMATION

(71) Applicant: Align Technology, Inc., San Jose, CA (US)

(72) Inventors: Bob Grove, San Jose, CA (US); Eric Kuo, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/846,118

(22) Filed: Apr. 10, 2020

(65) Prior Publication Data

US 2020/0297459 A1  Sep. 24, 2020

Related U.S. Application Data

(63) Continuation of application No. 13/786,300, filed on Mar. 5, 2013, now Pat. No. 10,617,489.

(60) Provisional application No. 61/739,600, filed on Dec. 19, 2012.

(51) Int. Cl.
*A61C 7/00* (2006.01)
*A61C 9/00* (2006.01)

(52) U.S. Cl.
CPC ............ *A61C 7/002* (2013.01); *A61C 9/0053* (2013.01)

(58) Field of Classification Search
CPC ............................. A61C 7/002; A61C 9/0053
See application file for complete search history.

(56) References Cited

U.S. PATENT DOCUMENTS

| | | | |
|---|---|---|---|
| 2,467,432 | A | 4/1949 | Kesling |
| 3,407,500 | A | 10/1968 | Kesling |
| 3,600,808 | A | 8/1971 | Reeve et al. |
| 3,660,900 | A | 5/1972 | Andrews et al. |
| 3,683,502 | A | 8/1972 | Wallshein et al. |
| 3,738,005 | A | 6/1973 | Cohen et al. |
| 3,860,803 | A | 1/1975 | Levine |

(Continued)

FOREIGN PATENT DOCUMENTS

| | | |
|---|---|---|
| AU | 3031677 A | 5/1979 |
| AU | 517102 B2 | 7/1981 |

(Continued)

OTHER PUBLICATIONS

Martegani, P., et al. "Morphometric study of the interproximal unit in the esthetic region to correlate anatomic variables affecting the aspect of soft tissue embrasure space." Journal of periodontology 78.12 (2007): 2260-2265. (Year: 2007).*

(Continued)

*Primary Examiner* — Bijan Mapar
(74) *Attorney, Agent, or Firm* — Wilson Sonsini Goodrich & Rosati

(57) ABSTRACT

Creating a digital tooth model of a patient's tooth using interproximal information is provided. Interproximal information is received that represents a space between adjacent physical teeth of the patient. A digital teeth model of a set of physical teeth of the patient that includes the adjacent physical teeth is received. One or more digital tooth models is created that more accurately depicts one or more of the physical teeth than the corresponding digital teeth included in the digital teeth model based on the interproximal information.

26 Claims, 11 Drawing Sheets

(56) References Cited

U.S. PATENT DOCUMENTS

| | | |
|---|---|---|
| 3,916,526 A | 11/1975 | Schudy |
| 3,922,786 A | 12/1975 | Lavin |
| 3,950,851 A | 4/1976 | Bergersen |
| 3,983,628 A | 10/1976 | Acevedo |
| 4,014,096 A | 3/1977 | Dellinger |
| 4,195,046 A | 3/1980 | Kesling et al. |
| 4,253,828 A | 3/1981 | Coles et al. |
| 4,324,546 A | 4/1982 | Heitlinger et al. |
| 4,324,547 A | 4/1982 | Arcan et al. |
| 4,328,620 A | 5/1982 | Mack et al. |
| 4,348,178 A | 9/1982 | Kurz |
| 4,447,207 A | 5/1984 | Kataoka et al. |
| 4,478,580 A | 10/1984 | Barrut et al. |
| 4,500,294 A | 2/1985 | Lewis et al. |
| 4,504,225 A | 3/1985 | Yoshii |
| 4,505,673 A | 3/1985 | Yoshii et al. |
| 4,526,540 A | 7/1985 | Dellinger et al. |
| 4,575,330 A | 3/1986 | Hull et al. |
| 4,575,805 A | 3/1986 | Moermann et al. |
| 4,591,341 A | 5/1986 | Andrews et al. |
| 4,609,349 A | 9/1986 | Cain et al. |
| 4,611,288 A | 9/1986 | Duret et al. |
| 4,656,860 A | 4/1987 | Orthuber et al. |
| 4,663,720 A | 5/1987 | Duret et al. |
| 4,664,626 A | 5/1987 | Kesling et al. |
| 4,676,747 A | 6/1987 | Kesling et al. |
| 4,742,464 A | 5/1988 | Duret et al. |
| 4,755,139 A | 7/1988 | Abbatte et al. |
| 4,763,791 A | 8/1988 | Halverson et al. |
| 4,793,803 A | 12/1988 | Martz et al. |
| 4,798,534 A | 1/1989 | Breads et al. |
| 4,836,778 A | 6/1989 | Baumrind et al. |
| 4,837,732 A | 6/1989 | Brandestini et al. |
| 4,850,864 A | 7/1989 | Diamond et al. |
| 4,850,865 A | 7/1989 | Napolitano et al. |
| 4,856,991 A | 8/1989 | Breads et al. |
| 4,859,181 A | 8/1989 | Neumeyer |
| 4,877,398 A | 10/1989 | Kesling et al. |
| 4,880,380 A | 11/1989 | Martz et al. |
| 4,889,238 A | 12/1989 | Batchelor et al. |
| 4,890,608 A | 1/1990 | Steer et al. |
| 4,935,635 A | 6/1990 | O'Harra et al. |
| 4,936,862 A | 6/1990 | Walker et al. |
| 4,937,928 A | 7/1990 | Van Der Zel et al. |
| 4,941,826 A | 7/1990 | Loran et al. |
| 4,964,770 A | 10/1990 | Steinbichler et al. |
| 4,975,052 A | 12/1990 | Spencer et al. |
| 4,983,334 A | 1/1991 | Adell et al. |
| 4,997,369 A | 3/1991 | Shafir et al. |
| 5,011,405 A | 4/1991 | Lemchen |
| 5,015,183 A | 5/1991 | Fenick |
| 5,017,133 A | 5/1991 | Miura et al. |
| 5,027,281 A | 6/1991 | Rekow et al. |
| 5,035,613 A | 7/1991 | Breads et al. |
| 5,055,039 A | 10/1991 | Abbatte et al. |
| 5,059,118 A | 10/1991 | Breads et al. |
| 5,090,047 A | 2/1992 | Angotti et al. |
| 5,100,316 A | 3/1992 | Wildman et al. |
| 5,121,333 A | 6/1992 | Riley et al. |
| 5,125,832 A | 6/1992 | Kesling |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,143,086 A | 9/1992 | Duret et al. |
| 5,145,364 A | 9/1992 | Martz et al. |
| 5,176,517 A | 1/1993 | Truax et al. |
| 5,184,306 A | 2/1993 | Erdman et al. |
| 5,186,623 A | 2/1993 | Breads et al. |
| 5,237,998 A | 8/1993 | Duret et al. |
| 5,257,184 A | 10/1993 | Mushabac |
| 5,257,203 A | 10/1993 | Riley et al. |
| 5,273,429 A | 12/1993 | Rekow et al. |
| 5,278,756 A | 1/1994 | Lemchen et al. |
| 5,328,362 A | 7/1994 | Watson et al. |
| 5,338,198 A | 8/1994 | Wu et al. |
| 5,340,309 A | 8/1994 | Robertson et al. |
| 5,342,202 A | 8/1994 | Deshayes et al. |
| 5,368,478 A | 11/1994 | Andreiko et al. |
| 5,382,164 A | 1/1995 | Stern et al. |
| 5,395,238 A | 3/1995 | Andreiko et al. |
| 5,431,562 A | 7/1995 | Andreiko et al. |
| 5,440,326 A | 8/1995 | Quinn et al. |
| 5,440,496 A | 8/1995 | Andersson et al. |
| 5,447,432 A | 9/1995 | Andreiko et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| RE35,169 E | 3/1996 | Lemchen et al. |
| 5,518,397 A | 5/1996 | Andreiko et al. |
| 5,528,735 A | 6/1996 | Strasnick et al. |
| 5,533,895 A | 7/1996 | Andreiko et al. |
| 5,542,842 A | 8/1996 | Andreiko et al. |
| 5,549,476 A | 8/1996 | Stern et al. |
| 5,562,448 A | 10/1996 | Mushabac |
| 5,587,912 A | 12/1996 | Andersson et al. |
| 5,605,459 A | 2/1997 | Kuroda et al. |
| 5,607,305 A | 3/1997 | Andersson et al. |
| 5,614,075 A | 3/1997 | Andre, Sr. et al. |
| 5,621,648 A | 4/1997 | Crump et al. |
| 5,645,420 A | 7/1997 | Bergersen et al. |
| 5,645,421 A | 7/1997 | Slootsky et al. |
| 5,655,653 A | 8/1997 | Chester et al. |
| 5,683,243 A | 11/1997 | Andreiko et al. |
| 5,688,118 A | 11/1997 | Hayka et al. |
| 5,692,894 A | 12/1997 | Schwartz et al. |
| 5,725,376 A | 3/1998 | Poirier et al. |
| 5,725,378 A | 3/1998 | Wang et al. |
| 5,733,126 A | 3/1998 | Andersson et al. |
| 5,740,267 A | 4/1998 | Echerer et al. |
| 5,742,700 A | 4/1998 | Yoon et al. |
| 5,799,100 A | 8/1998 | Clarke et al. |
| 5,800,174 A | 9/1998 | Andersson et al. |
| 5,823,778 A | 10/1998 | Schmitt et al. |
| 5,842,858 A | 12/1998 | Truppe |
| 5,848,115 A | 12/1998 | Little et al. |
| 5,857,853 A | 1/1999 | Van Nifterick et al. |
| 5,866,058 A | 2/1999 | Batchelder et al. |
| 5,879,158 A | 3/1999 | Doyle et al. |
| 5,880,961 A | 3/1999 | Crump et al. |
| 5,880,962 A | 3/1999 | Andersson et al. |
| 5,934,288 A | 8/1999 | Avila et al. |
| 5,957,686 A | 9/1999 | Anthony et al. |
| 5,964,587 A | 10/1999 | Sato et al. |
| 5,971,754 A | 10/1999 | Sondhi et al. |
| 5,975,893 A | 11/1999 | Chishti et al. |
| 6,015,289 A | 1/2000 | Andreiko et al. |
| 6,044,309 A | 3/2000 | Honda et al. |
| 6,049,743 A | 4/2000 | Baba et al. |
| 6,062,861 A | 5/2000 | Andersson |
| 6,068,482 A | 5/2000 | Snow et al. |
| 6,099,314 A | 8/2000 | Kopelman et al. |
| 6,120,290 A | 9/2000 | Fukushima et al. |
| 6,123,544 A | 9/2000 | Cleary |
| 6,152,731 A | 11/2000 | Jordan et al. |
| 6,183,248 B1 | 2/2001 | Chishti et al. |
| 6,190,165 B1 | 2/2001 | Andreiko et al. |
| 6,206,693 B1 | 3/2001 | Hultgren |
| 6,213,769 B1 | 4/2001 | Bettega et al. |
| 6,217,325 B1 | 4/2001 | Chishti et al. |
| 6,217,334 B1 | 4/2001 | Hultgren et al. |
| 6,244,861 B1 | 6/2001 | Andreiko et al. |
| 6,296,483 B1 | 10/2001 | Champleboux |
| 6,309,215 B1 | 10/2001 | Phan et al. |
| 6,315,553 B1 | 11/2001 | Sachdeva et al. |
| 6,315,555 B1 | 11/2001 | Bortolotti |
| 6,322,359 B1 | 11/2001 | Jordan et al. |
| 6,350,120 B1 | 2/2002 | Sachdeva et al. |
| 6,355,049 B1 | 3/2002 | Gill |
| 6,382,975 B1 | 5/2002 | Poirier et al. |
| 6,398,548 B1 | 6/2002 | Muhammad et al. |
| 6,402,707 B1 | 6/2002 | Ernst et al. |

(56) References Cited

U.S. PATENT DOCUMENTS

| | | |
|---|---|---|
| 6,482,298 B1 | 11/2002 | Bhatnagar et al. |
| 6,524,101 B1 | 2/2003 | Phan et al. |
| 6,554,611 B2 | 4/2003 | Shishti et al. |
| 6,572,372 B1 | 6/2003 | Phan et al. |
| 6,579,095 B2 | 6/2003 | Marshall et al. |
| 6,582,931 B1 | 6/2003 | Kois et al. |
| 6,629,840 B2 | 10/2003 | Chishti et al. |
| 6,688,885 B1 | 2/2004 | Sachdeva et al. |
| 6,705,863 B2 | 3/2004 | Phan et al. |
| 6,722,880 B2 | 4/2004 | Chishti et al. |
| 6,966,772 B2 | 11/2005 | Malin et al. |
| 7,123,767 B2 | 10/2006 | Jones et al. |
| 7,160,111 B2 | 1/2007 | Baughman |
| 7,247,021 B2 | 7/2007 | Jones et al. |
| 7,286,954 B2 | 10/2007 | Kopelman et al. |
| 7,362,890 B2 | 4/2008 | Scharlack et al. |
| 7,494,338 B2 | 2/2009 | Durbin et al. |
| 7,689,398 B2 | 3/2010 | Cheng et al. |
| 7,728,989 B2 | 6/2010 | Doherty et al. |
| 7,806,688 B2 | 10/2010 | Knutson |
| 7,835,811 B2 | 11/2010 | Schmitt |
| 8,035,637 B2 | 10/2011 | Kriveshko |
| 8,108,189 B2 | 1/2012 | Chelnokov et al. |
| 8,172,573 B2 | 5/2012 | Sonenfeld et al. |
| 8,348,669 B1 | 1/2013 | Schmitt |
| 8,366,442 B2 | 2/2013 | Schmitt |
| 8,556,626 B2 | 10/2013 | Evenson |
| 8,908,918 B2 | 12/2014 | Daon et al. |
| 10,617,489 B2 | 4/2020 | Grove et al. |
| 2002/0006597 A1 | 1/2002 | Andreiko et al. |
| 2002/0013636 A1 | 1/2002 | O'Brien et al. |
| 2002/0102517 A1 | 8/2002 | Poirier |
| 2003/0009252 A1 | 1/2003 | Pavlovskaia et al. |
| 2003/0039389 A1 | 2/2003 | Jones et al. |
| 2003/0044749 A1 | 3/2003 | Marotta |
| 2003/0139834 A1 | 7/2003 | Nikolskiy et al. |
| 2003/0224311 A1 | 12/2003 | Cronauer et al. |
| 2004/0015176 A1 | 1/2004 | Cosman |
| 2004/0076926 A1 | 4/2004 | Baughman |
| 2004/0128010 A1 | 7/2004 | Pavlovskaia et al. |
| 2004/0219480 A1 | 11/2004 | Malin |
| 2005/0055118 A1 | 3/2005 | Nikolskiy et al. |
| 2005/0095552 A1* | 5/2005 | Sporbert .......... A61C 9/0053 433/24 |
| 2005/0147944 A1 | 7/2005 | Karim et al. |
| 2005/0244791 A1* | 11/2005 | Davis .......... A61C 7/00 433/213 |
| 2005/0271996 A1* | 12/2005 | Sporbert .......... A61C 7/00 433/24 |
| 2006/0001739 A1 | 1/2006 | Babayoff |
| 2006/0154198 A1 | 7/2006 | Durbin et al. |
| 2007/0026363 A1 | 2/2007 | Lehmann et al. |
| 2008/0057461 A1* | 3/2008 | Cheng .......... A61C 7/00 433/24 |
| 2008/0085489 A1 | 4/2008 | Schmitt |
| 2008/0138771 A1 | 6/2008 | Knutson |
| 2008/0199827 A1 | 8/2008 | Kamer |
| 2008/0286715 A1 | 11/2008 | Choi |
| 2009/0191502 A1 | 7/2009 | Cao et al. |
| 2010/0151416 A1 | 6/2010 | Kim et al. |
| 2010/0191510 A1 | 7/2010 | Kopelman et al. |
| 2011/0008751 A1 | 1/2011 | Pettersson |
| 2011/0049738 A1 | 3/2011 | Sun et al. |
| 2011/0077913 A1 | 3/2011 | Kuo et al. |
| 2012/0088208 A1 | 4/2012 | Schulter et al. |
| 2013/0084538 A1 | 4/2013 | Cho |
| 2013/0273492 A1 | 10/2013 | Suttin, Sr. et al. |
| 2014/0170583 A1 | 6/2014 | Kuo |
| 2014/0170587 A1 | 6/2014 | Kopelman et al. |

FOREIGN PATENT DOCUMENTS

| | | |
|---|---|---|
| AU | 5598894 A | 6/1994 |
| CA | 1121955 A | 4/1982 |
| DE | 2749802 A1 | 5/1978 |
| DE | 69327661 T2 | 7/2000 |
| EP | 0091876 A1 | 10/1983 |
| EP | 0299490 A2 | 1/1989 |
| EP | 0376873 A2 | 7/1990 |
| EP | 0490848 A2 | 6/1992 |
| EP | 0541500 A1 | 5/1993 |
| EP | 0667753 B1 | 1/2000 |
| EP | 0774933 B1 | 12/2000 |
| EP | 0731673 B1 | 5/2001 |
| ES | 463897 A1 | 1/1980 |
| FR | 2369828 A1 | 6/1978 |
| FR | 2652256 A1 | 3/1991 |
| GB | 1550777 A | 8/1979 |
| JP | S5358191 A | 5/1978 |
| JP | H0428359 A | 1/1992 |
| JP | H08508174 A | 9/1996 |
| WO | WO-9008512 A1 | 8/1990 |
| WO | WO-9104713 A1 | 4/1991 |
| WO | WO-9410935 A1 | 5/1994 |
| WO | WO-9832394 A1 | 7/1998 |
| WO | WO-9844865 A1 | 10/1998 |
| WO | WO-9858596 A1 | 12/1998 |
| WO | WO-0008415 A1 | 2/2000 |

OTHER PUBLICATIONS

Cho, H. S., Jang, H. S., Kim, D. K., Park, J. C., Kim, H. J., Choi, S. H., . . . & Kim, B. O. (2006). The effects of interproximal distance between roots on the existence of interdental papillae according to the distance from the contact point to the alveolar crest. Journal of periodontology, 77(10) (Year: 2006).*

AADR. American Association for Dental Research, Summary of Activities, Mar. 20-23, 1980, Los Angeles, CA, p. 195.

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," IADR Abstracts, Program and Abstracts of Papers, 57th General Session, IADR Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6):953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

(56) References Cited

OTHER PUBLICATIONS

Baumrind, "Integrated Three-Dimensional Craniofacial Mapping: Background, Principles, and Perspectives," Semin. in Orthod., 7(4):223-232 (Dec. 2001).
Begole et al., "A Computer System for the Analysis of Dental Casts," The Angle Orthod., 51(3):253-259 (Jul. 1981).
Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.
Bhatia et al., "A Computer-Aided Design for Orthognathic Surgery," Br. J. Oral Maxillofac. Surg., 22:237- 253(1984).
Biggerstaff, "Computerized Diagnostic Setups and Simulations," Angle Orthod., 40(1):28-36 (Jan. 1970).
Biggerstaff et al., "Computerized Analysis of Occlusion in the Postcanine Dentition," Am. J. Orthod., 61(3): 245-254 (Mar. 1972).
Biostar Operation & Training Manual. Great Lakes Orthodontics, Ltd. 199 Fire Tower Drive, Tonawanda, New York. 14150-5890, 20 pages total (1990).
Blu, et al., "Linear interpolation revitalized", IEEE Trans. Image Proc., 13(5):710-719 (May 2004).
Bourke, "Coordinate System Transformation," (Jun. 1996), p. 1, retrieved from the Internet Nov. 5, 2004, URL< http://astronomy.swin.edu.au/—pbourke/prolection/coords>.
Boyd et al., "Three Dimensional Diagnosis and Orthodontic Treatment of Complex Malocclusions With the Invisalign Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on the Uses of the Computer in Orthodontic Practice (Part 1)," J. Clin. Orthod., 13(7):442-453 (Jul. 1979).
Burstone (interview), "Dr. Charles J. Burstone on the Uses of the Computer in Orthodontic Practice (Part 2)," J. Clin. Orthod., 13(8):539-551 (Aug. 1979).
Cardinal Industrial Finishes, Powder Coatings information posted at<http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cho, et al. The effects of interproximal distance between roots on the existence of interdental papillae according to the distance from the contact point to the alveolar crest. J Periodontol. Oct. 2006;77(10):1651-7.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside, Part 2 F. Duret—A Man with a Vision, Part 3 The Computer Gives New Vision—Literally, Part 4 Bytes 'N Bites—The Computer Moves from the Front Desk to the Operatory," Canadian Dental Journal, vol. 54 (9), pp. 661-666 (1988).
Crooks, "CAD/CAM Comes to USC," USC Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004<http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances—Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et al., "Automated Finite Element Modeling of a Human Mandible with Dental Implants," JS WSCG '98—Conference Program, retrieved from the Internet:<http://wscg.zcu.cz/wscg98/papers98/Strasser 98.pdf, 8 pages.
Gao et al., "3-D element Generation for Multi-Connected Complex Dental and Mandibular Structure," Proc. Inti Workshop on Medical Imaging and Augmented Reality, pp. 267-271 (Jun. 12, 2001).
Gim-Alldent Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management, "J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxillofacial Surgery," AAOMS, 3 pages total, (Sep. 13, 1990).
Guess et al., "Computer Treatment Estimates in Orthodontics and Orthognathic Surgery," JCO, pp. 262-28 (Apr. 1989).
Heaven et al., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the

(56) References Cited

OTHER PUBLICATIONS

Internet on Nov. 5, 2004, URL http://static.highbeam.com/t/toolingampproduction/november011996/simulatingstressputonfa . . . >.

Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).

Hoffmann, et al., "Role of Cephalometry for Planning of Jaw Orthopedics and Jaw Surgery Procedures," (Article Summary in English, article in German), Informationen, pp. 375-396 (Mar. 1991).

Hojjatie et al., "Three-Dimensional Finite Element Analysis of Glass-Ceramic Dental Crowns," J. Biomech., 23(11):1157-1166 (1990).

Huckins, "CAD-CAM Generated Mandibular Model Prototype from MRI Data," AAOMS, p. 96 (1999).

Important Tip About Wearing the Red White & Blue Active Clear Retainer System. Allesee Orthodontic Appliances—Pro Lab. 1 page (1998).

JCO Interviews, "Craig Andreiko , DDS, MS on the Elan and Orthos Systems," JCO, pp. 459-468 (Aug. 1994).

JCO Interviews, "Dr. Homer W. Phillips on Computers in Orthodontic Practice, Part 2," JCO. 1997; 1983:819-831.

Jerrold, "The Problem, Electronic Data Transmission and the Law," AJO-DO, pp. 478-479 (Apr. 1988).

Jones et al., "An Assessment of the Fit of a Parabolic Curve to Pre- and Post-Treatment Dental Arches," Br. J. Orthod., 16:85-93 (1989).

JP Faber et al., "Computerized Interactive Orthodontic Treatment Planning," Am. J. Orthod., 73(1):36-46 (Jan. 1978).

Kamada et.al., Case Reports on Tooth Positioners Using LTV Vinyl Silicone Rubber, J. Nihon University School of Dentistry (1984) 26(1): 11-29.

Kamada et.al., Construction of Tooth Positioners with LTV Vinyl Silicone Rubber and Some Case KJ Reports, J. Nihon University School of Dentistry (1982) 24(1):1-27.

Kanazawa et al., "Three-Dimensional Measurements of the Occlusal Surfaces of Upper Molars in a Dutch Population," J. Dent Res., 63(11):1298-1301 (Nov. 1984).

Kesling, Coordinating the Predetermined Pattern and Tooth Positioner with Conventional Treatment, KN Am. J. Orthod. Oral Surg. (1946) 32:285-293.

Kesling et al., The Philosophy of the Tooth Positioning Appliance, American Journal of Orthodontics and Oral surgery. 1945; 31:297-304.

Kleeman et al., The Speed Positioner, J. Clin. Orthod. (1996) 30:673-680.

Kochanek, "Interpolating Splines with Local Tension, Continuity and Bias Control," Computer Graphics, ri 18(3):33-41 (Jul. 1984).

KM Oral Surgery (1945) 31 :297-30.

Kunii et al., "Articulation Simulation for an Intelligent Dental Care System," Displays 15:181-188 (1994).

Kuroda et al., Three-Dimensional Dental Cast Analyzing System Using Laser Scanning, Am. J. Orthod. Dentofac. Orthop. (1996) 110:365-369.

Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.

Leinfelder, et al., "A New Method for Generating Ceramic Restorations: a CAD-CAM System," J. Am. 1-1 Dent. Assoc., 118(6):703-707 (Jun. 1989).

Manetti, et al., "Computer-Aided Cefalometry and New Mechanics in Orthodontics," (Article Summary in English, article in German), Fortschr Kieferorthop. 44, 370-376 (Nr. 5), 1983.

Martegani, et al. Morphometric study of the interproximal unit in the esthetic region to correlate anatomic variables affecting the aspect of soft tissue embrasure space. Journal of periodontology 78.12 (2007): 2260-2265.

McCann, "Inside the ADA," J. Amer. Dent. Assoc., 118:286-294 (Mar. 1989).

McNamara et al., "Invisible Retainers," J. Clin. Orthod., pp. 570-578 (Aug. 1985).

McNamara et al., Orthodontic and Orthopedic Treatment in the Mixed Dentition, Needham Press, pp. 347-353 (Jan. 1993).

Moermann et al., "Computer Machined Adhesive Porcelain Inlays: Margin Adaptation after Fatigue Stress," IADR Abstract 339, J. Dent. Res., 66(a):763 (1987).

Moles, "Correcting Mild Malalignments—As Easy as One, Two, Three," AOA/Pro Corner, vol. 11, No. 1, 2 pages (2002).

Mormann et al., "Marginale Adaptation von adhasuven Porzellaninlays in vitro," Separatdruck aus: Schweiz. Mschr. Zahnmed. 95: 1118-1129, 1985.

Nahoum, "The Vacuum Formed Dental Contour Appliance," N. Y. State Dent. J., 30(9):385-390 (Nov. 1964).

Nash, "CEREC CAD/CAM Inlays: Aesthetics and Durability in a Single Appointment," Dent. Today, 9(8):20, 22-23 (Oct. 1990).

Nishiyama et al., "A New Construction of Tooth Repositioner by LTV Vinyl Silicone Rubber," J. Nihon Univ. Sch. Dent., 19(2):93-102 (1977).

Paul et al., "Digital Documentation of Individual Human Jaw and Tooth Forms for Applications in Orthodontics, Oral Surgery and Forensic Medicine" Proc, of the 24th Annual Conf. of the IEEE Industrial Electronics Society (IECON '98), Sep. 4, 1998, pp. 2415-2418.

Pinkham, "Foolish Concept Propels Technology," Dentist, 3 pages total, Jan./Feb. 1989.

Pinkham, "Inventor's CAD/CAM May Transform Dentistry," Dentist, 3 pages total, Sep. 1990.

Ponitz, "Invisible Retainers," Am. J. Orthod., 59(3):266-272 (Mar. 1971).

Procera Research Projects, "Procera Research Projects 1993—Abstract Collection," pp. 3-7; 28 (1993).

Proffit et al., Contemporary Orthodontics, (Second Ed.), Chapter 15, Mosby Inc., pp. 470-533 (Oct. 1993).

Qiu, Lingling, et al. "Accuracy of orthodontic miniscrew implantation guided by stereolithographic surgical stent based on cone-beam CT-derived 3D images." The Angle Orthodontist 82.2 (2011): 284-293.

Raintree Essix & ARS Materials, Inc., Raintree Essix, Technical Magazine Table of contents and Essix Appliances,< http://www.essix.com/magazine/defaulthtml> Aug. 13, 1997.

Redmond et al., "Clinical Implications of Digital Orthodontics," Am. J. Orthod. Dentofacial Orthop., 117(2):240-242 (2000).

Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).

Rekow, "CAD/CAM in Dentistry: A Historical Perspective and View of the Future," J. Can. Dent. Assoc., 58(4):283, 287-288 (Apr. 1992).

Rekow, "Computer-Aided Design and Manufacturing in Dentistry: A Review of the State of the Art," J. Prosthet. Dent., 58(4):512-516 (Oct. 1987).

Rekow, "Dental CAD-CAM Systems: What is the State of the Art?", J. Amer. Dent. Assoc., 122:43-48 1991.

Rekow et al., "CAD/CAM for Dental Restorations—Some of the Curious Challenges," IEEE Trans. Biomed. Eng., 38(4):314-318 (Apr. 1991).

Rekow et al., "Comparison of Three Data Acquisition Techniques for 3-D Tooth Surface Mapping," Annual International Conference of the IEEE Engineering in Medicine and Biology Society, 13(1):344-345 1991.

Rekow, "Feasibility of an Automated System for Production of Dental Restorations, Ph.D. Thesis," Univ. of Minnesota, 244 pages total, Nov. 1988.

Richmond et al., "The Development of a 3D Cast Analysis System," Br. J. Orthod., 13(1):53-54 (Jan. 1986).

Richmond et al., "The Development of the PAR Index (Peer Assessment Rating): Reliability and Validity," Eur. J. Orthod., 14:125-139 (1992).

(56) References Cited

OTHER PUBLICATIONS

Richmond, "Recording the Dental Cast in Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System in Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolaryngol Head Neck Surg., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utiiisateur, Version 2.OX (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice is Clear: Red, White & Blue . . . The Simple, Affordable, No-Braces Treatment, Allesee Orthodontic Appliances—Pro Lab product information, 6 pages (2003).
The Choice is Clear: Red, White & Blue . . . The Simple, Affordable, No-Braces Treatment, Allesee HI Orthodontic Appliances—Pro Lab product information for doctors. http://ormco.com/aoa/appliancesservices/RWB/doctorhtml, 5 pages (May 19, 2003).
The Choice is Clear: Red, White & Blue . . . The Simple, Affordable, No-Braces Treatment, Allesee HJ Orthodontic Appliances—Pro Lab product information for patients, (http://ormco.com/aoa/appliancesservices/RWB/patients.html), 2 pages (May 19, 2003).
The Red, White & Blue Way to Improve Your Smile!, Allesee Orthodontic Appliances—Pro Lab product information for patients, 2 pages (1992).
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11)769-778 (1993.
Varady et al., "Reverse Engineering of Geometric Models—An Introduction," Computer-Aided Design, 29(4):255-268,1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 388-400.
WARUNEK et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987).
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL(http://wscg.zcu.cz/wscg98/wscg98.h).
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf, of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May be a Candidate for this Invisible No-Braces Treatment, Allesee Orthodontic Appliances-Pro Lab product information for patients, 2 pages (2002).

\* cited by examiner

CREATING A DIGITAL DENTAL MODEL OF A PATIENT'S TEETH USING INTERPROXIMAL INFORMATION

RELATED APPLICATION SECTION

This application is a continuation of U.S. patent application Ser. No. 13/786,300, filed on Mar. 5, 2013, now U.S. Pat. No. 10,617,489, issued Apr. 14, 2020, which claims priority to and benefit of Provisional U.S. Patent Application No. 61/739,600, filed on Dec. 19, 2012 entitled "CREATING A DIGITAL DENTAL MODEL OF A PATIENT'S TEETH USING INTERPROXIMAL INFORMATION" by Grove et al., and assigned to the assignee of the present application.

This application is related to co-pending U.S. patent application Ser. No. 13/719,823 filed on Dec. 19, 2012 entitled "APPARATUS AND METHOD FOR OPTICALLY SCANNING AN OBJECT IN REGISTRATION WITH A REFERENCE PATTERN" by Kuo, assigned to the assignee of the present application and to the extent not repeated herein, the contents of this related patent application are hereby incorporated herein by reference.

This application is related to U.S. Patent Application No. 61/739,450 filed on Dec. 19, 2012 entitled "METHODS AND SYSTEMS FOR DENTAL PROCEDURES" by Kopelman, assigned to the assignee of the present application and to the extent not repeated herein, the contents of this related patent application are hereby incorporated herein by reference.

This application is related to co-pending U.S. patent application Ser. No. 13/787,634 filed on Mar. 6, 2013, entitled "METHODS AND SYSTEMS FOR DENTAL PROCEDURES" by Kopelman, which claims priority to U.S. Patent Application No. 61/739,450 filed on Dec. 19, 2012 entitled "METHODS AND SYSTEMS FOR DENTAL PROCEDURES" by Kopelman, assigned to the assignee of the present application.

BACKGROUND

Orthodontic treatments involve repositioning misaligned teeth and improving bite arrangements for improved cosmetic appearance and dental function. Conventionally, repositioning of teeth has been accomplished by what are commonly referred to as "braces." Braces comprise a variety of elements such as brackets, bands, archwires, ligatures, and O-rings. After some of these elements are bonded to the teeth, periodic appointments with the treating doctor are required to adjust the braces. This involves bending or installing different archwires having different force-inducing properties, and/or replacing ligatures and O-rings.

An alternative to braces includes the use of elastic positioning dental appliances (also known as "aligners") for repositioning teeth. Such an appliance can be comprised of a thin shell of elastic material that generally conforms to a patient's teeth but each appliance to be used at a treatment stage has a cavity geometry that is slightly out of alignment with the teeth arrangement at the start of that treatment stage. Placement of the elastic positioning dental appliance over the teeth applies controlled forces in specific locations to gradually move the teeth into a new arrangement as defined by the cavity of the appliance. Repetition of this process moves the teeth through a series of intermediate arrangements to a final desired arrangement. Due to the limited space within the oral cavity and extensive movements that some teeth typically undergo as a part of treatment, the teeth will often be moved throughout the series of intermediate tooth arrangements to properly arrange the teeth. Thus, a single patient treated with elastic positioning dental appliance may experience from 2 to perhaps 50 or more aligner stages (with an average of 25-30 aligner stages per arch) before achieving the final desired teeth arrangement.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

Figure 1:
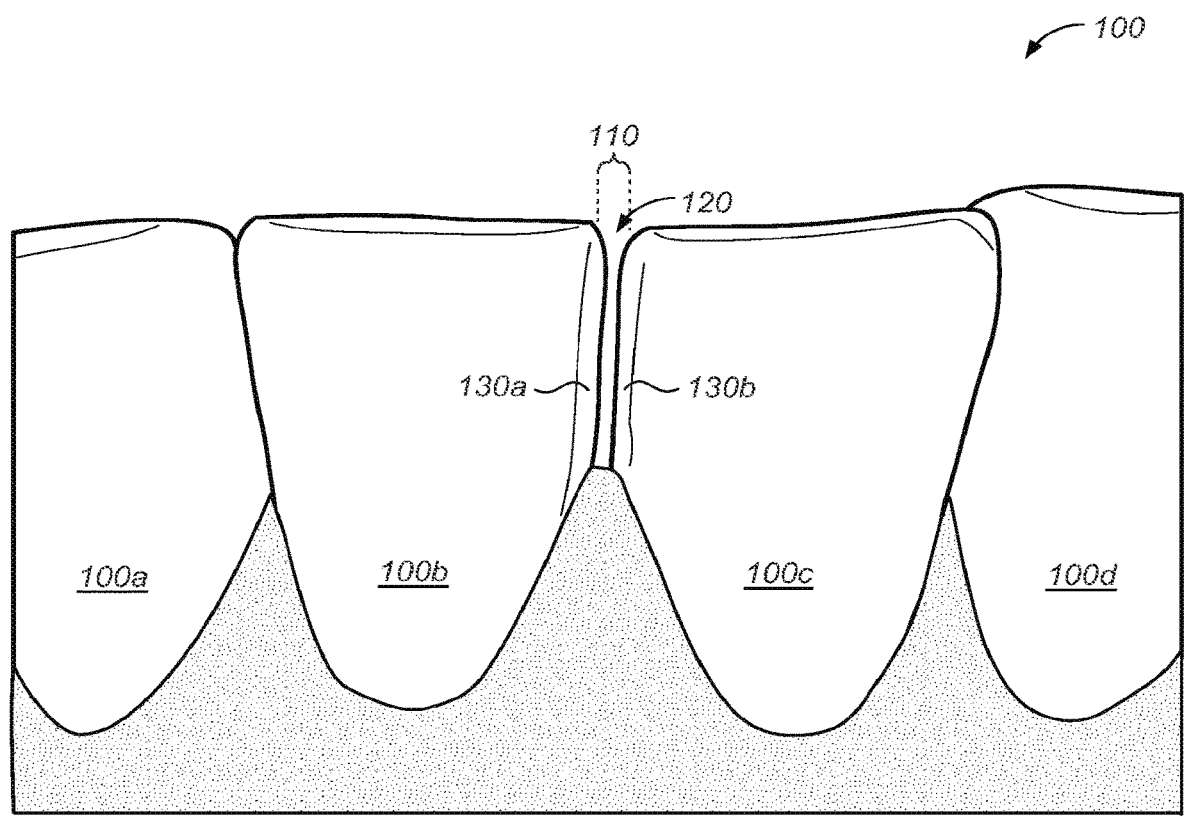
FIG. 1 illustrates an example of a patient's physical teeth, according to one embodiment.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope of the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the description of embodiments, discussions utilizing terms such as "receiving," "accessing," "creating," "depicting," "specifying," "obtaining," "representing," "corresponding," "including," "identifying," "removing," "moving," "determining," or the like, refer to the actions and processes of a computer system, data storage system, storage system controller, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Various methods can be used for creating digital teeth models that can be used for record keeping/visualization, restorative or orthodontic purposes. One of the orthodontic purposes which digital teeth models can be used is to help create dental appliances for correcting the position of a patient's teeth. One method involves making a three dimensional (3D) virtual model of the patient's physical teeth. The three dimensional virtual model can be based on a digital directly or indirectly of a patient's teeth such as directly by an intraoral scan or other direct scan of a patient's physical teeth or indirectly based on a scan of a manually obtained impression of the patient's physical teeth or a scan of a model made from a manually obtained impression of the patient's physical teeth. All of these are collectively referred to as a digital scan. One or more elastic positioning dental appliances can be fabricated from digital data that is created based on the three dimensional virtual model.

Frequently a patient's physical teeth have interproximal spaces between them—either naturally occurring or intentionally created by the doctor—which a fully successful course of treatment will close, significantly reduce or even enlarge (as in the case for making space for restorative dental treatments). Typically, an interproximal space between two adjacent physical teeth that is smaller than approximately 0.25 millimeters (mm) may be too small to be represented in a digital scan obtained, for example, as set out in paragraph (18).

Therefore, the interproximal space may not be properly represented in a conventional three dimensional (3D) virtual model that is created based on the digital scan. The digital teeth in a conventional three dimensional (3D) virtual model that correspond to the adjacent physical teeth may appear to be connected, i.e. have no interproximal space. Various embodiments are provided for creating one or more digital tooth models that more accurately depict one or more physical teeth based on interproximal information that represents an interproximal space as a part of more successfully reducing or closing an interproximal space.

In situations where an interdental space is present, the space may be sufficiently small whereby the accurate reproduction of the pre-existing space in a dental model of the teeth may be difficult or impossible. These spaces may be naturally occurring or artificially introduced through orthodontic treatment, for example, or through mechanical means such as a dental procedure whereby the teeth are reshaped.

For example, in situations where dental crowding is present, or when certain teeth are not the correct/desired shape, recontouring of the teeth may be desirable (also called "interproximal reduction" or "IPR" for short). This can be accomplished through any number of dental instruments, including abrasive strips, discs, and/or burs. The result is that the teeth are narrowed and the resulting space in between the teeth is known as an interproximal space. An interproximal space may also be created by orthodontically moving adjacent teeth away from each other.

Depending on if the gum tissue, which normally occupies the undercut between adjacent teeth is present (also known as a papilla), the interproximal space may either be a vertical space with relatively uniform width from the occlusal-most portion of the contact to the gums, or in the case of missing papilla, a vertical space at the occlusal-most portion of the contact which opens up into a triangular space near the gum line due to the undercuts of the adjacent teeth and the missing papilla.

When small spaces are created, for example width-wise, or if teeth are obstructing the space due to crowding arrangements, trying to accurately determine the dimensions of the space using scans or impressions of the teeth can be particularly challenging. This is because in order for the dimensions to be accurately captured, the impression material needs to flow in between the teeth and not be torn upon removal of the impression. If the material which flows in between the teeth becomes torn, then the resulting model of the teeth will appear as if the teeth are actually touching, when in fact, a space is present in between.

For digital scans of the teeth, small spaces may be difficult to accurately capture because the scan is unable to properly characterize the areas where a direct line of sight cannot be obtained as a result of obstruction from the tooth structure being scanned.

Therefore, according to one embodiment, a way to accurately capture the width and shape of the interproximal spaces (if any) is provided so that what is present in the mouth of the patient can be more accurately reproduced in a digital reconstruction of the patient's teeth on the computer.

FIG. 1 illustrates an example of a patient's physical teeth 100, according to one embodiment. For the sake of simplicity, FIG. 1 depicts a few of the patient's physical teeth 100a, 100b, 100c, 100d instead of the entire set of the patient's physical teeth 100. As depicted in FIG. 1, there is a space 110 between the physical teeth 100b, 100c that are adjacent. According to one embodiment, at least a portion of the space 110 is a minimal space where the adjacent physical teeth 100b, 100c are closest to each other. The space 110 is also referred to as an interproximal space 110 and the physical teeth 100b, 100c that are adjacent are also referred to as adjacent physical teeth 100b, 100c. The interproximal space 110 may be naturally occurring or may be artificially created. The physical teeth 100b, 100c have contours 130a, 130b in the area 120. The area between the contours 130a, 130b of adjacent teeth 100b, 100c defines the area 120 when the teeth are aligned along an arch.

When teeth are properly aligned along an arch as depicted in FIG. 1, the interproximal space is defined by the narrowest distance between a mesial and distal surface of adjacent teeth 100b and 100c. However, if an adjacent tooth is rotated, as is commonly the case when teeth are not properly aligned, the interproximal space may be defined by the narrowest space between any surface of two adjacent teeth (e.g., mesial, distal, buccal, lingual or more commonly a contour portion).

Sometimes dental personnel artificially create an interproximal space 110 between aligned adjacent physical teeth 100*b*, 100*c* in order to facilitate treatment. One way to artificially create an interproximal space 110 is interproximal reduction. As depicted in FIG. 1, the interproximal space 110 is, at least in part, artificially created due to interproximal reduction, and, therefore, the physical tooth 100*c*'s contour 130*b* has a flattened surface. An interproximal space 110 may be artificially created using other methods such as expansion, retraction, and moving one or more teeth, for example, to avoid extracting teeth when the patient's jaw is too small for their teeth to fit in.

Figure 2:
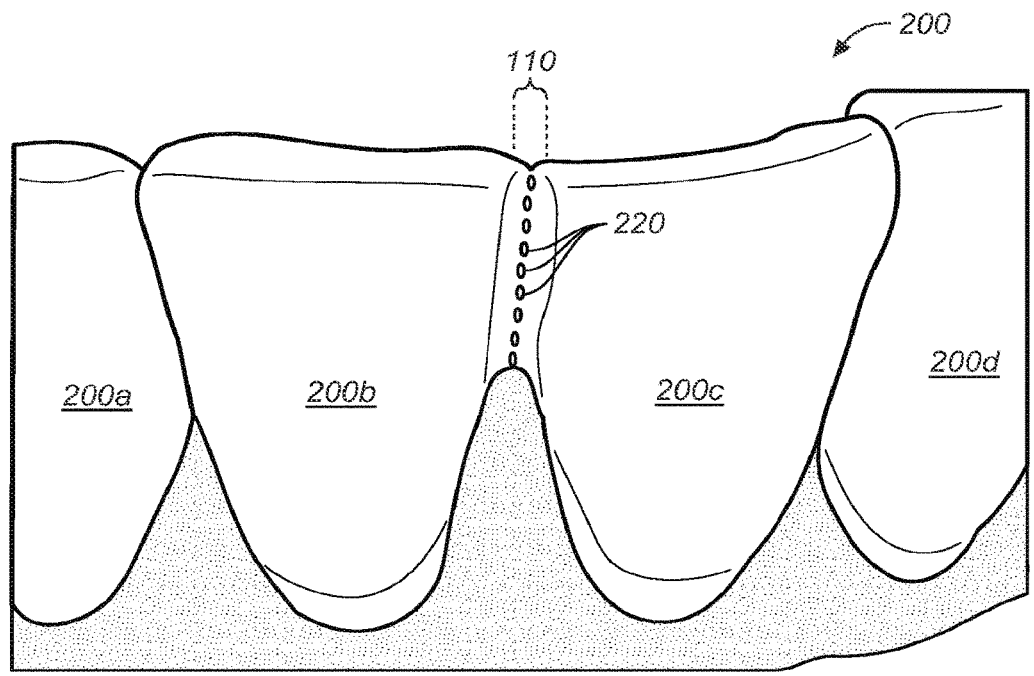
FIG. 2 illustrates an example of a digital teeth model that represents the patient's set of physical teeth, according to one embodiment.

FIG. 2 illustrates an example of a digital teeth model 200 that represents the patient's set of physical teeth 100 (FIG. 1), according to one embodiment. The digital teeth model 200 can be obtained with a digital scan, as described in paragraph (18) hereof. Many types of imaging or scanning may be used to obtain a digital teeth model 200. One example of an intraoral scanner that may be used is the Itero brand scanner by Cadent.

The digital teeth model 200 includes digital teeth 200*a*-200*d* that represents each of the patient's physical teeth 100 (FIG. 1). Each of the digital teeth 200*a*-200*d*, according to one embodiment, represents one physical tooth 100*a*-100*d*. For example, digital tooth 200*a* represents physical tooth 100*a*, digital tooth 200*b* represents physical tooth 100*b*, digital tooth 200*c* represents physical tooth 100*c*, and digital tooth 200*d* represents physical tooth 100*d*. The adjacent digital teeth 200*b*, 200*c* respectively represent the adjacent physical teeth 100*b*, 100*c*.

The current technology for obtaining a digital teeth model 200 using a digital scan, as discussed herein may not accurately depict relatively small interproximal spaces. Therefore, the space 110 (FIG. 1) between the adjacent physical teeth 100*b*, 100*c* (FIG. 1) may not be properly/accurately depicted in the digital teeth model 200. Instead, the adjacent digital teeth 200*b*, 200*c* (FIG. 2) appear to be at least partially connected, for example, at a location 210 in the digital teeth model 200. As will become more evident, the holes 220, which result from missing data, may be filled in, for example, during a cleanup process causing the adjacent digital teeth 200*b* and 200*c* to appear connected or a rough estimated interproximal gap may be created.

Figure 3:
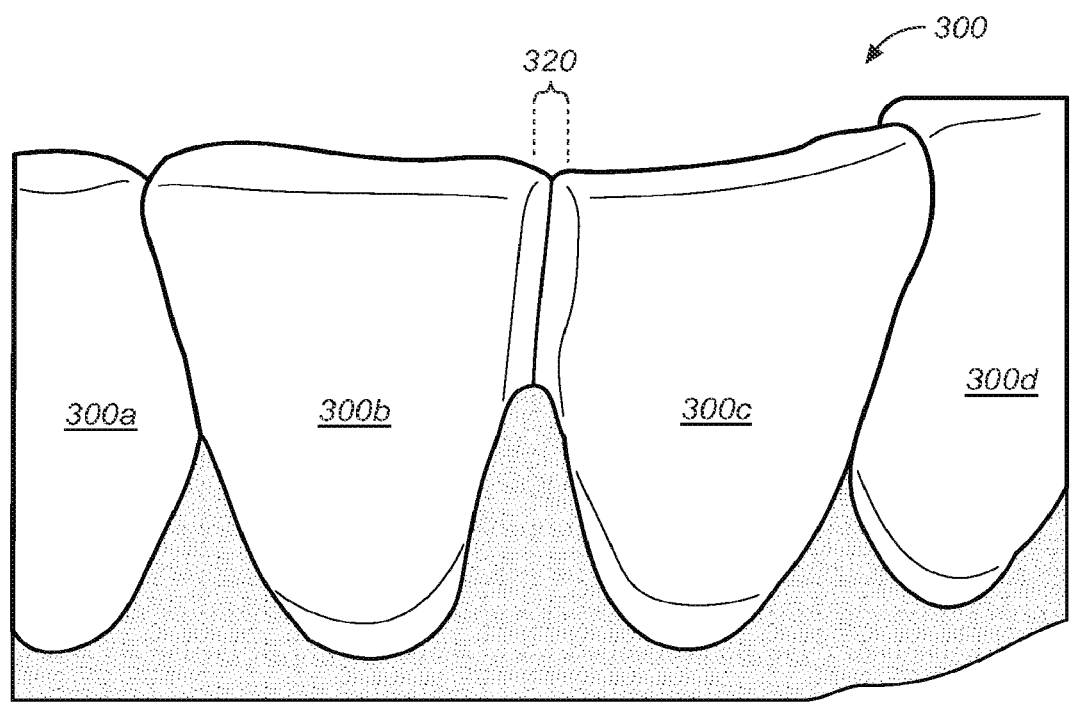
FIG. 3 illustrates an example of a conventional three dimensional (3D) virtual model that was created based on a digital teeth model, according to one embodiment.

FIG. 3 illustrates an example of a conventional 3D virtual model 300 that was created based on a digital teeth model 200, according to one embodiment. Each of the digital teeth 300*a*-300*d* in the conventional 3D virtual model 300, according to one embodiment, represents one physical tooth 100*a*-100*d* (FIG. 1). For example, digital tooth 300*a* represents physical tooth 100*a*, digital tooth 300*b* represents physical tooth 100*b*, digital tooth 300*c* represents physical tooth 100*c*, and digital tooth 300*d* represents physical tooth 100*d*. The conventional 3D virtual model 300 includes adjacent digital teeth 300*b*, 300*c* that correspond to the adjacent physical teeth 100*b*, 100*c* (FIG. 1).

The conventional 3D virtual model 300 may be created by a meshing process. Since the space 110 (FIG. 1) between the adjacent physical teeth 100*b*, 100*c* (FIG. 1) is too small for a digital scan to recognize, the adjacent digital teeth 300*b*, 300*c* in the digital tooth 300*a*-300*d* model appear to be connected due to the current meshing process filling the holes 220 (FIG. 2) resulting in a filled in interproximal space 320 between the adjacent digital teeth 300*b*, 300*c* of the conventional 3D virtual model 300.

Figure 4:
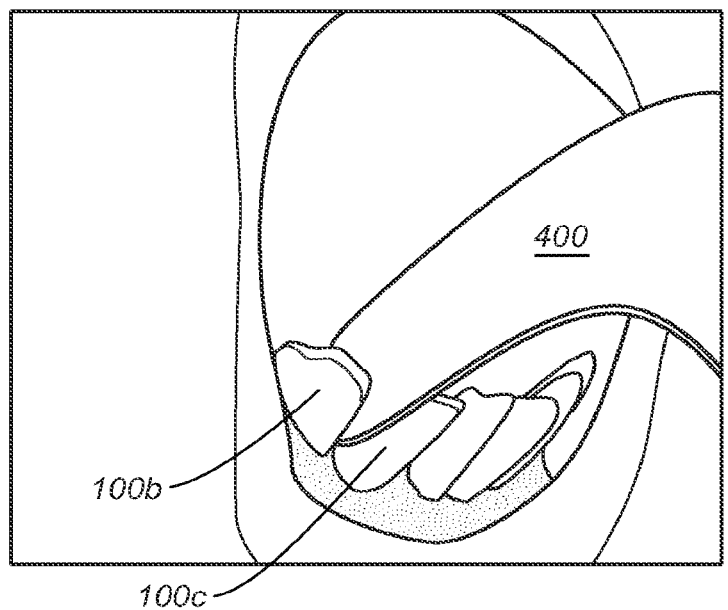
FIG. 4 illustrates the use of an instrument to measure an interproximal space between adjacent physical teeth, according to one embodiment.

FIG. 4 illustrates the use of an instrument 400 to measure an interproximal space between adjacent physical teeth, according to one embodiment. According to one embodiment, the instrument 400 is a piece of metal, plastic or other material of a known thickness. The instrument 400 can be inserted between the adjacent physical teeth 100*b*, 100*c* (FIG. 1). Several instruments 400 of different known thicknesses can be used. For example, instruments 400 in increments of approximately 0.1 mm may be used. When the appropriate amount of resistance results from the insertion of a particular instrument 400, the thickness of that instrument 400 can be used as the interproximal information that represents the interproximal space 110 (FIG. 1). Each of the instruments 400 may have a label or other indicia specifying the thickness of each of the instruments 400.

FIGS. 9*a*-9*f* depict scannable objects that can be inserted between adjacent physical teeth 100*b*, 100*c* and used as a part of determining interproximal information that represents a space 110 between the adjacent physical teeth 100*b*, 100*c*, according to various embodiments. A digital teeth model can be created by performing a digital scan on the patient's physical teeth 100 with a scannable object inserted snugly into a minimal space at the closest distance between the adjacent physical teeth 100*b*, 100*c*. If physical impressions are used, the object may be captured within the impression either as a "negative" of the object or as part of a "pick up" impression, whereby the object remains physically embedded in the impression (in the same position where originally placed on the teeth) when the impression is removed. In this regard, the object is scannable indirectly whether as a negative geometry or as picked up via the impression. The scannable object can be digitally removed from the digital teeth model to obtain all or a part of the interproximal information based on information related to the scannable object.

Figure 9A:
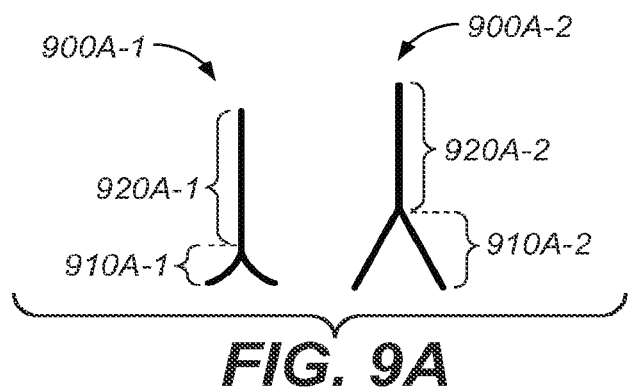
FIGS. 9a-9f depict scannable objects that can be inserted between adjacent physical teeth and used as a part of determining interproximal information that represents a space between the adjacent physical teeth, according to various embodiments.

FIG. 9*a* depicts scannable objects 900*a*-1, 900*a*-2 with a portion 910*a*-1, 910*a*-2, that is shim shaped with different thicknesses along the shim shaped portion 910*a*-1, 910*a*-2. The scannable objects 900*a*-1, 900*a*-2 also have non-shim shaped portions 920*a*-1, 920*a*-2.

Figure 9B:
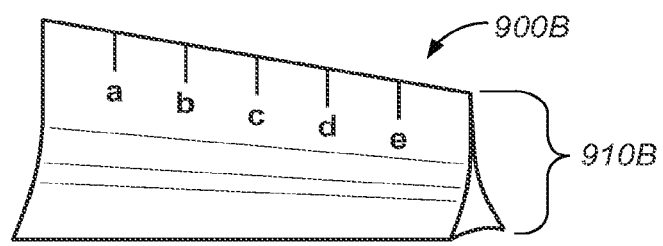

FIG. 9*b* depicts a scannable object 900B with a portion 910*b* that is shim shaped with different thicknesses along the shim shaped portion 910*b*. Although FIGS. 9*a* and 9*b* depict sides of the shim shaped portions 910*a*-1, 910*b*-2, 910*b* that are symmetrical with respect to each other, various embodiments are well suited for the respective sides of the shim shaped portions 910*a*-1, 910*b*-2, 910*b* to not be symmetrical.

Figure 9C:
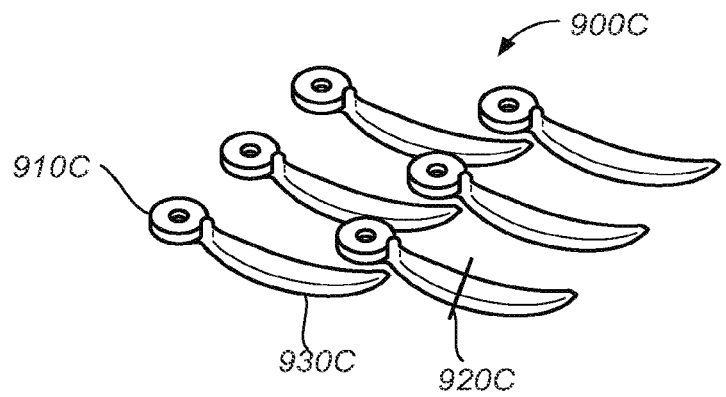

FIG. 9*c* depicts a scannable object 900*c* that is a triodent V-wedge, according to one embodiment. The scannable object 900*c* has a V shaped portion 920*c* at the cross section indicated by the line, a curved portion 930*c*, and a handle 910*c*. The V shaped portion 920*c*, according to one embodiment, is a shim shaped portion with different thicknesses along the shim shaped portion. The curved portion 930*c* can be used as a part of approximating a curvature of contours associated with the adjacent physical teeth. The handle 910*c* can have information describing parameters associated with the scannable object 900*c*, such as the height, width, lateral curvature, base curvature, the point of the curvature and the radius of the curvature. The parameters can be used as a part of determining dimensional information associated with a space 110.

Figure 9D:
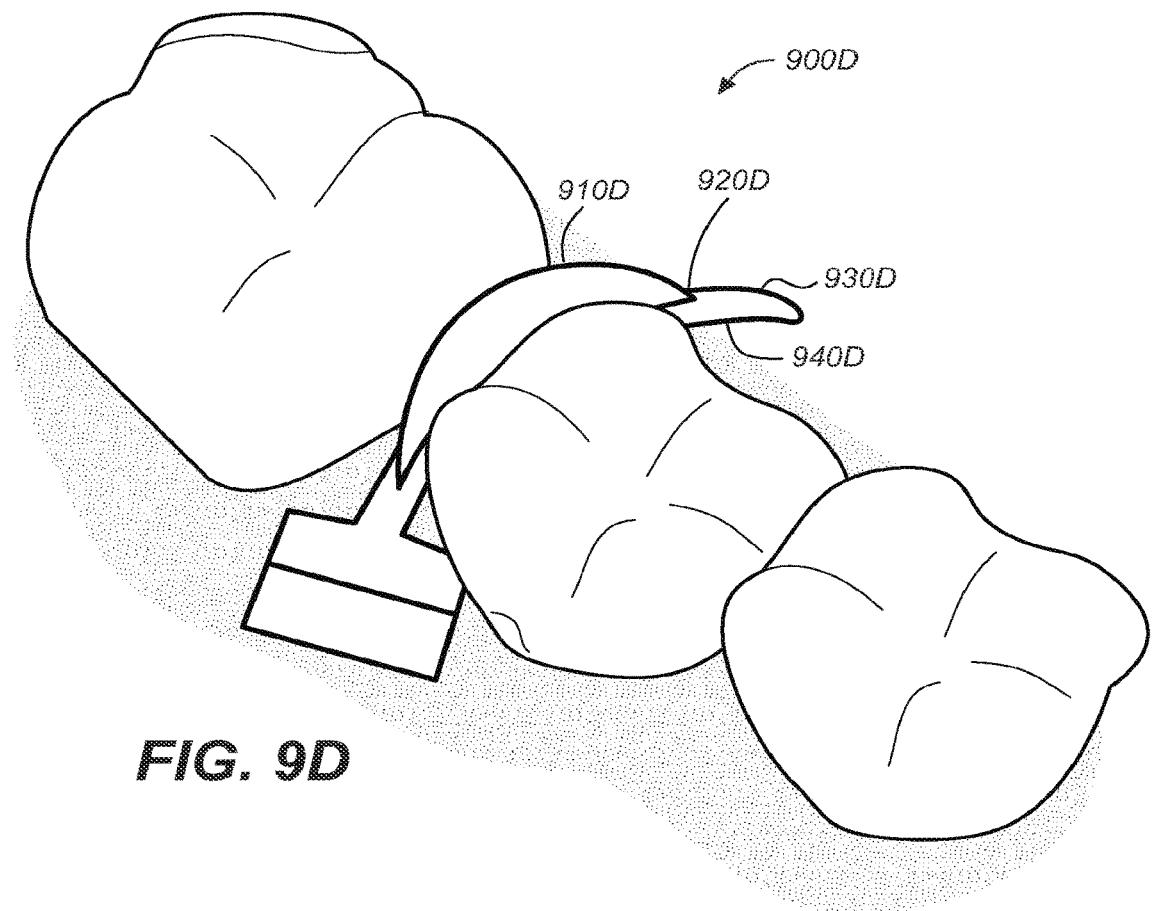

FIG. 9*d* depicts a scannable object 900*d* that is a Triodent "fender" inserted between adjacent physical teeth, according to one embodiment. The scannable object 900*d* includes a metal shim shaped portion 910*d* located at the apex 920*d* of a V shaped portion 930d. According to one embodiment, the V shaped portion 930d is a shim shaped portion with different thicknesses along the shim shaped portion. According to one embodiment, the scannable object 900d includes a curved portion 940d. The curved portion 940d can be used as a part of determining a curvature of contours associated with the adjacent physical teeth as depicted in FIG. 9d.

Figure 9E:
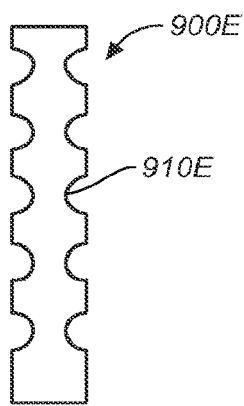
Figure 9F:
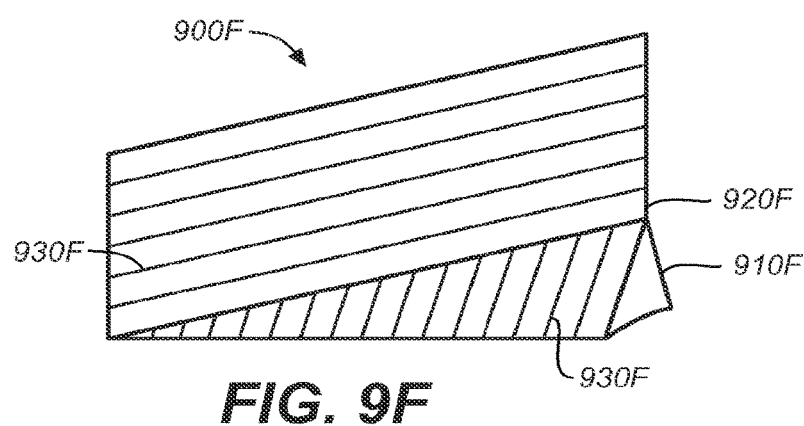

FIG. 9e depicts a scannable object 900e that has notches 910e, according to one embodiment. FIG. 9f depicts a scannable object 900f that has a shim shaped portion 910f and a non shim shaped portion 920f, according to one embodiment. The scannable objects 900e 900f depicted respectively in FIGS. 9e and 9f include respective indicia, such as notches 910e or lines 930f, that can be used for determining one or more dimensions associated with a space 110. According to one embodiment, the scannable object 900c is a rigid object. According to one embodiment, any one or more of the scannable objects 900a-900g can be translucent. For example, assuming that the scanning device's line of sight is located on one side of the translucent scannable object 900a-900g, the digital scan can at least approximate a tooth located on the other side of the translucent scannable object 900a-900g. However, various embodiments are well suited for a scannable objects 900a-900g that is opaque or semi-translucent, among other things.

According to one embodiment, a scannable object as depicted in FIGS. 9a-9f can have indicia that can be used for determining one or more dimensions associated with a space 110. For example, information pertaining to the geometry of a scannable object can be associated with a handle 910c (FIG. 9c). In another example, notches 910e (FIG. 9e) or lines 930f (FIG. 9f) can be used to determine one or more dimensions of a space 110. Examples of a dimension include but are not limited to a width or a height associated with the space 110. A dimension may be a width associated with the minimal space based on the thickness of a portion of the scannable object. A dimension may be a height of an interproximal area that results from interproximal reduction of at least one of the adjacent physical teeth. The indicia can be used to determine one or more dimensions from a digital teeth model of the set of physical teeth taken with the scannable object inserted into the space 110, as will become more evident.

Figure 10A:
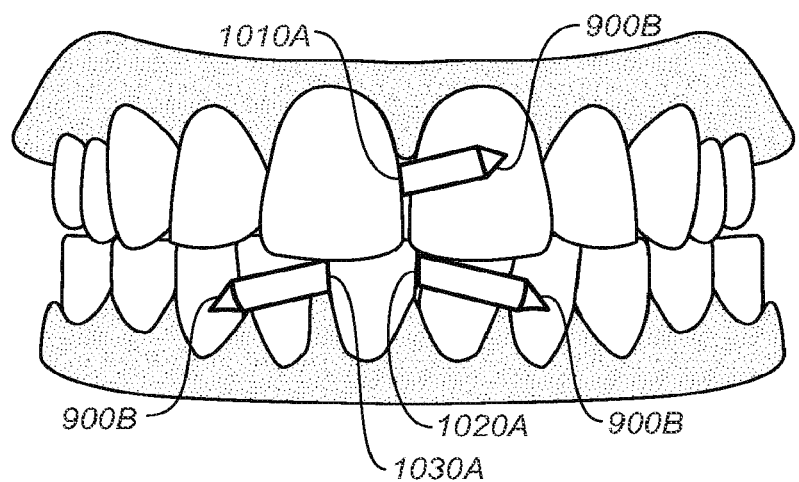
FIGS. 10a-10c depict scannable objects inserted between adjacent physical teeth, according to various embodiments.
Figure 10B:
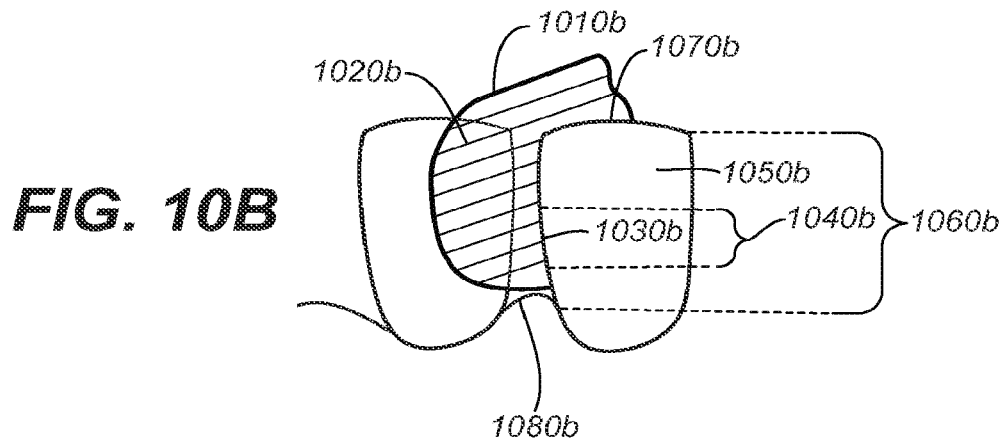
Figure 10C:
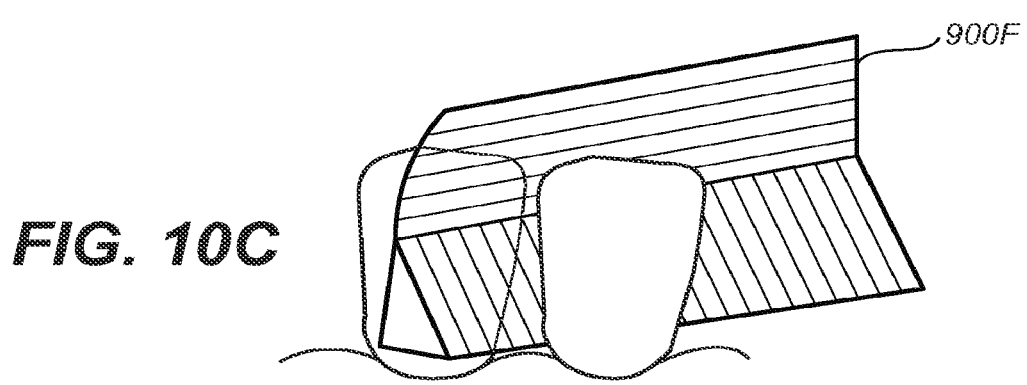

FIGS. 10a-10c depict scannable objects inserted between adjacent physical teeth, according to various embodiments.

FIG. 10a depicts several scannable objects 900b inserted between the adjacent physical teeth to more accurately determine the shape or size of the respective spaces 1010a, 1020a, 1030a. The spaces 1010a, 1020a, 1030a between various adjacent physical teeth in this illustration are triangular shaped. Each of the scannable objects 900b depicted in FIG. 10a may be different sizes selected to best fit the respective space 1010a, 1020a, 1030a that they are inserted into.

FIG. 10b depicts a scannable object 1010b for determining a height associated with a space between adjacent physical teeth. The scannable object 1010b has indicia 1020b as described herein. The indicia 1020b can be used to determine a height 1040b of an interproximal area 1030b that resulted from interproximal reduction of at least one 1050b of the adjacent physical teeth. The indicia 1020b can be used to determine a height 1060b between the top 1070b of at least one of the adjacent physical teeth and the papilla 1080b of the gingival between the adjacent physical teeth.

FIG. 10c depicts a scannable object 900f (FIG. 9f) inserted between adjacent physical teeth that can also be used for determining a dimension associated with the space between the adjacent physical teeth. For example, the scannable object 900f can be used for determining a width associated with the minimal space based on the thickness of a portion of the scannable object 900f, determining a height of an interproximal area that results from interproximal reduction of at least one of the adjacent physical teeth, or determining a height between the top of at least one of the adjacent physical teeth and the papilla of the gingiva between the adjacent physical teeth, as discussed herein.

A first digital teeth model can be created by digitally scanning the set of physical teeth with a scannable object (FIGS. 9a-9f) snugly inserted into the minimal space between the adjacent physical teeth and the scannable object can be digitally removed from the first digital teeth model to determine all or part of the interproximal based on information related to the scannable object. The scannable object can be removed, according to one embodiment, by receiving a second digital teeth model of the set of physical teeth of the patient without the scannable object inserted into the space and moving segmented teeth of the second digital teeth model to coincide with locations of the teeth of the first digital model.

A scannable object (FIGS. 9a-9f) can be used for determining the closest distance between the adjacent physical teeth, a spatial orientation of the adjacent physical teeth relative to the closest distance and the location of the closest distance. For example, referring to FIG. 10a, the positions of the scannable objects 900b reflect the spatial orientation of the respective physical teeth that the scannable objects 900b are between. The scannable objects 900b can be inserted snugly into the respective spaces 1010a, 1020a, 1030a to determine the locations of the closest distances between the respective adjacent physical teeth and to determine the spatial orientations relative to the closest distances.

One or more dimensions can be determined based on indicia associated with the scannable object (FIGS. 9a-9f) in the first digital teeth model, as discussed herein. Indicia associated with an exposed portion of the inserted scannable object can be used to determine the one or more dimensions. Various embodiments are well suited to dimensions besides just width or height information. Various embodiments are well suited for any dimensional information that enables more accurately model the space between the adjacent physical teeth. For example, the dimensional information may include shapes or sizes, or a combination there of, among other things, of various portions or areas of the space. The dimensional information may be three dimensional (3D) information. Scannable objects with curved shaped portions can be used to more accurately model curved contours and scannable objects with shim shaped portions can be used to more accurately model triangularly shaped contours, among other things as discussed herein. The best fitting scannable object, according to one embodiment, is selected for insertion to more accurately capture one or more dimensions associated with the space.

Figure 5:
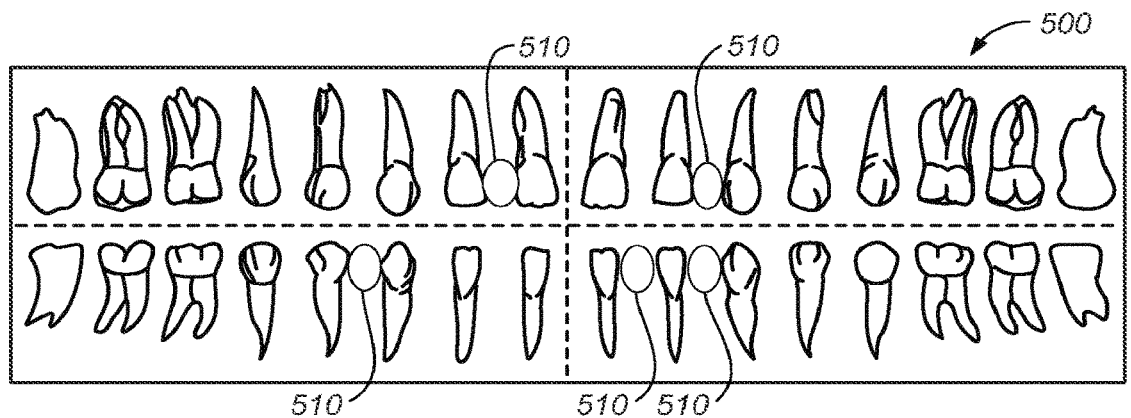
FIG. 5 illustrates an example of a user interface, according to one embodiment.

FIG. 5 illustrates an example of a user interface 500, according to one embodiment. FIG. 5 is an example of a user interface 500 that is described by way of illustration and not by way of limitation. According to one embodiment, the user interface 500 is a part of a system that performs digital scans.

As illustrated in FIG. 5, the user interface 500 depicts representations of teeth. Dental personnel, such as a doctor or a technician, can specify interproximal information using the user interface 500. For example, the dental personnel can specify a measurement between adjacent physical teeth, identification of the adjacent physical teeth, and identification of any physical teeth with flattened surfaces due to interproximal reduction, among other things. The adjacent physical teeth can be specified with respect to the other physical teeth. As depicted in FIG. 5, adjacent physical teeth with respective interproximal spaces between them have been specified by circling 510 between the adjacent physical teeth. Other methods of specifying adjacent physical teeth can be used. For example, the name or location, or a combination there of can be used to specify adjacent physical teeth. The user interface 500 may receive information that an interproximal reduction is planned to be or has been performed on at least one of the adjacent physical teeth.

Although the user interface 500 illustrated in FIG. 5 depicts representations of teeth, various embodiments are well suited to a user interface 500 for specifying interproximal information without depicting representations of teeth. For example, other methods of specifying adjacent physical teeth can be used. For example, the user interface may provide fields or drop down menus, among other things, for specifying the names of adjacent physical teeth or locations of adjacent physical teeth, the amount and/or special relationship of the interproximal space or a combination thereof.

Alternatively or in addition to using the user interface 500, the dental personnel may submit a digital or physical form specifying the appropriate information, or a subset thereof, when sending the digital scan, for example, to a facility that creates digital tooth models, according to various embodiments. Other methods besides a user interface 500, such as a form, may also be used for specifying that an interproximal reduction is planned to be or has been performed on at least one of the adjacent physical teeth.

The specified interproximal information can be used as a part of a segmentation process that creates digital tooth models 600 (FIG. 6) from the digital teeth model 200 (FIG. 2) while maintaining the interproximal space, according to one embodiment.

Figure 6:
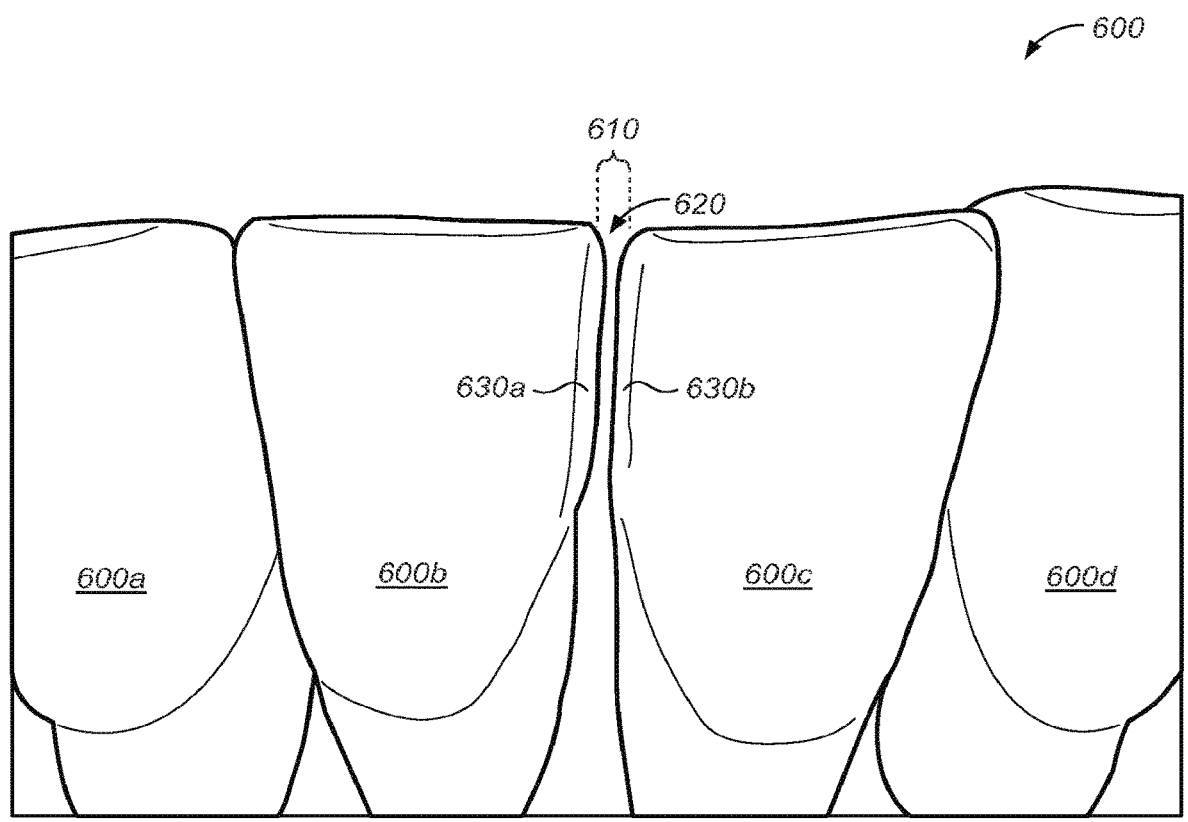
FIG. 6 illustrates an example of created digital tooth models, according to one embodiment.

FIG. 6 illustrates an example of created digital tooth models 600, according to one embodiment. According to one embodiment, the created digital tooth models 600 are three dimensional models of the patient's physical teeth 100 (FIG. 1). Each of the digital tooth models 600, according to one embodiment, represents one physical tooth 100 (FIG. 1). For example, digital tooth model 600a represents physical tooth 100a, digital tooth model 600b represents physical tooth 100b, digital tooth model 600c represents physical tooth 100c, and digital tooth model 600d represents physical tooth 100d.

The digital tooth models 600 can be created based on the interproximal information that represents the space 110 (FIG. 1) between the adjacent physical teeth 100b, 100c (FIG. 1) that correspond to the digital tooth models 600b, 600c (FIG. 6). According to one embodiment, the digital tooth models 600 are created as a part of segmenting the digital teeth model 200 (FIG. 2) into the digital tooth models 600 while maintaining the interproximal space 610 (FIG. 6) based on the interproximal information pertaining to a physical interproximal space 110 (FIG. 1).

As discussed herein, with the conventional segmentation process, since the space 110 (FIG. 1) between the adjacent physical teeth 100b, 100c (FIG. 1) is too small for a digital scan to recognize, the adjacent digital teeth 300b, 300c (FIG. 3) in the conventional three dimensional (3D) virtual model 300 (FIG. 3) appear to be, at least partially, connected due to the conventional meshing or other cleanup process filling the holes 2210 in the area at 210 between the adjacent digital teeth 220b, 200c (FIG. 2). In contrast, according to various embodiments, the segmentation process will receive interproximal information and will prevent filling the holes 210 (FIG. 2) and will use this information to help properly create the interproximal surfaces of adjacent teeth.

The digital tooth models 600 more accurately depict the adjacent physical teeth 100b, 100c (FIG. 1) than the digital teeth 200b, 200c (FIG. 2) in the digital teeth model 200 (FIG. 2) due to being created based on the interproximal information, according to one embodiment. For example, since the interproximal space 110 between the adjacent physical teeth 100b, 100c is too small for the digital scan to recognize, the interproximal space at location 210 is not properly depicted between the adjacent digital teeth 200b, 200c (FIG. 2) in the digital teeth model 200 (FIG. 2). When a conventional 3D virtual model 300 (FIG. 3) is created from the digital teeth model 200 (FIG. 2), the adjacent digital teeth 300b, 300c (FIG. 3) in the conventional 3D virtual model 300 (FIG. 3) appear to be connected in the interproximal space 320 (FIG. 3) between the digital teeth 300b, 300c. In contrast, according to various embodiments, interproximal information is obtained prior to or as part of performing the segmentation process on the digital teeth model 200 (FIG. 2) to maintain the interproximal space 610 (FIG. 6) between respectively created digital tooth models 600 (FIG. 6).

Further, the exemplary created digital tooth models 600 can more accurately depict the contours or flattened surfaces (where IPR has been performed) of the area of the adjacent physical teeth. For the sake of illustration, assume that the flattened surface (FIG. 6) of contour 630a (FIG. 6) corresponds to the flattened surface of contour 130a (FIG. 1) and the contours 630a, 630b (FIG. 6) correspond to the contours 130a, 130b (FIG. 1). The digital tooth model 600c can more accurately depict a flattened surface associated with contour 130b of the corresponding physical tooth 100c (FIG. 1), which was caused by interproximal reduction on that physical tooth 100c, than a corresponding surface associated with the digital tooth 200c (FIG. 2). Further, the contours 630a, 630b (FIG. 6) more accurately depict the contours 130a, 130b (FIG. 1) than corresponding surfaces associated with the digital teeth 200b, 200c (FIG. 2).

According to one embodiment, the contour of the tooth in this context is "visible contour" of the tooth when viewed from specified direction. In particular for the correct reconstruction of the tooth contours, the contour is the visible contour viewed from direction perpendicular to the dental arch and parallel to the occlusal plane. Due to possible imprecision of a digital scan, the interproximal space 320 between the teeth 300b and 300c may be filled and some of the contours are missed in the vicinity of the interproximal space 320 (FIG. 3). According to one embodiment, the interproximal space and associated visible contours are restored using the interproximal information that represents the interproximal spaces as described herein. If the space is identified by the personal as corresponding to "interproximal reduction," then areas of the adjacent teeth can be restored on the 3D model to produce straight line contours and flat areas. If the space is identified as "natural", then areas of the adjacent teeth can be restored on the 3D model to produce natural contours and convex areas. In both cases though the amount of space is equal to the distance measured on physical teeth, according to one embodiment.

The contours, if natural, can be obtained by many means including using information of or from: the contours of other of the patient's teeth, based on photographs of the patient's teeth, contours of standard teeth, a database of teeth contour information, or the contours can be created by a technician.

According to one embodiment, an elastic positioning dental appliance (also known as "an aligner") for realigning teeth can be created based on the created digital tooth models 600. Such an appliance may be comprised of a thin shell of elastic material that generally conforms to a patient's physical teeth but each appliance to be used at a treatment stage has a cavity geometry that is slightly out of alignment with the teeth arrangement at the start of that treatment stage. Placement of the elastic positioning dental appliance over the physical teeth applies controlled forces in specific locations to gradually move the physical teeth into a new arrangement.

A series of aligners can be used to move the physical teeth through a series of intermediate arrangements to a final desired arrangement. Due to the limited space within the oral cavity and extensive movements that some physical teeth may typically undergo for treatment, at least some of the physical teeth will often be moved throughout the series of intermediate arrangements to properly arrange the physical teeth. Thus, a single patient treated with elastic positioning dental appliance may experience from 2 to over 50 stages (with an average of 25-30 aligner stages per arch) before achieving the final desired teeth arrangement.

According to one embodiment, the digital teeth model 200 (FIG. 2) is segmented into digital tooth models 600 (FIG. 6) so that the digital tooth models 600 (FIG. 6) can be based on the movement of the physical teeth 100 (FIG. 1) through the series of intermediate patterns due to the course of treatment. Each of the digital tooth models 600 (FIG. 6) may have one or more axes of its own and three dimensional (3D) coordinates so that each of the digital tooth models' 600 position can be based on the position of a corresponding physical tooth 100 (FIG. 1) at a given point in time, as will be described in more detail in the context of FIG. 11. By moving the digital tooth models 600 (FIG. 6), intermediate aligners can be fabricated for each of the series of intermediate patterns of physical teeth 100 (FIG. 1) movement.

Various embodiments are provided for creating one or more digital tooth models 600 (FIG. 6) that more accurately depict one or more physical teeth 100 (FIG. 1) based on interproximal information that represents the interproximal space 110 (FIG. 1). Thus, an aligner or a series of aligners that are created based on digital tooth models 600 (FIG. 6) that more accurately depict the physical teeth 100 (FIG. 1), according to various embodiments, can more successfully and more easily properly align the teeth and close or significantly reduce or enlarge, as desired, the interproximal spaces 110 (FIG. 1) between the patient's teeth 100 (FIG. 1).

More information pertaining to the planning and fabrication of aligners as dental appliances is described in detail in U.S. Pat. No. 5,975,893, and in published PCT application WO 98/58596 which designates the United States and which is assigned to the assignee of the present application.

Figure 7:
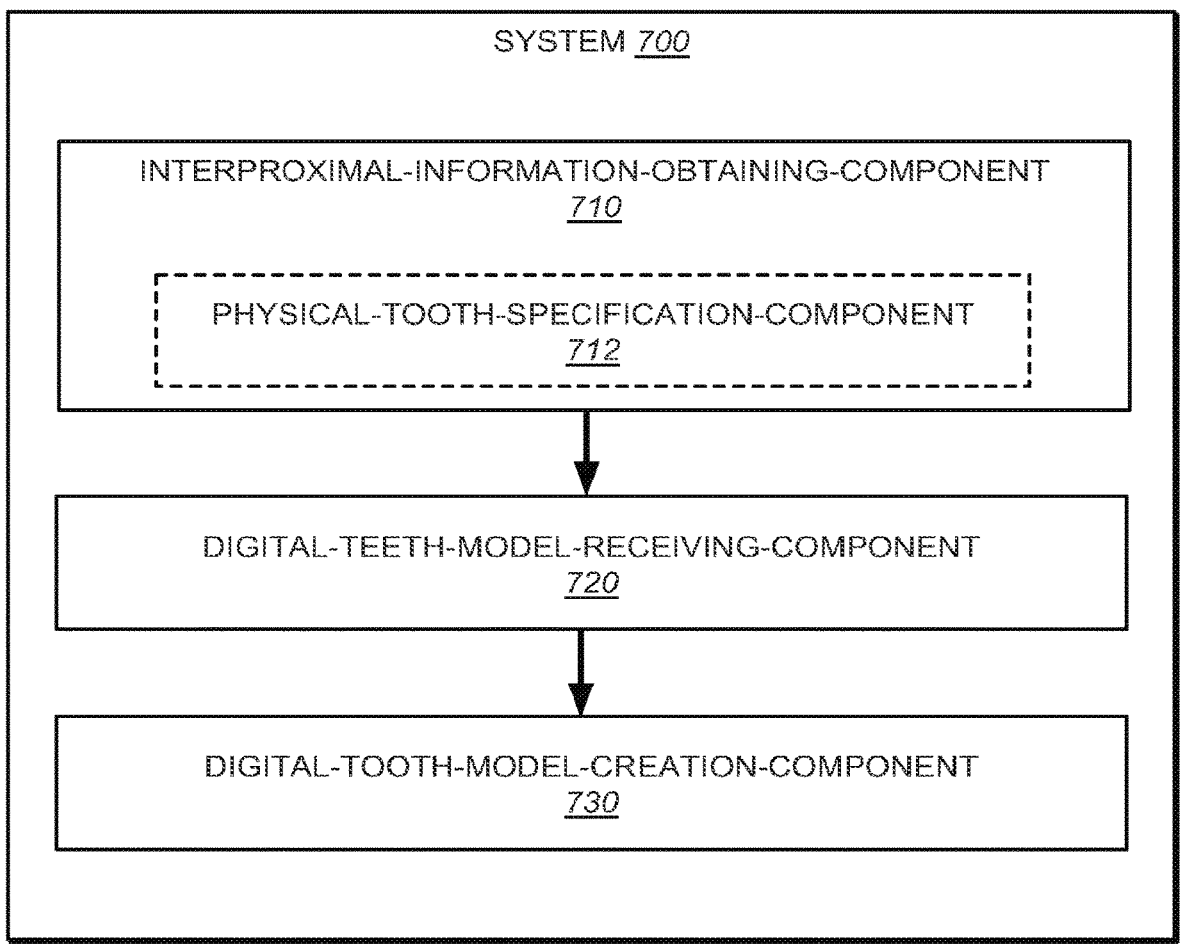
FIG. 7 illustrates a system for creating a digital tooth model of a patient's tooth using interproximal information, according to one embodiment.

FIG. 7 illustrates a system 700 for creating a digital tooth model 600 (FIG. 6) of a patient's tooth 100 (FIG. 1) using interproximal information, according to one embodiment. The blocks that represent features in FIG. 7 can be arranged differently than as illustrated, and can implement additional or fewer features than what are described herein. Further, the features represented by the blocks in FIG. 4 can be combined in various ways. The system 700 can be implemented using hardware, hardware and software, hardware and firmware, or a combination thereof. According to one embodiment, the system 700 is part of a system that performs segmentation, as discussed herein.

The system 700 can include an interproximal-information-obtaining-component 710, a digital-teeth-model-receiving-component 720, and a digital-tooth-model-creation-component 730. The system 700 may also include an optional physical-tooth-specification-component 712.

The interproximal-information-obtaining-component 710 is configured for receiving interproximal information that represents a space 110 (FIG. 1) between adjacent physical teeth 100b, 100c (FIG. 1) of the patient. The space 110 (FIG. 1) may represent a naturally occurring space between the adjacent physical teeth 100b, 100c or represent an artificially created space between the adjacent physical teeth 100b, 100c.

The digital-teeth-model-receiving-component 720 is configured for receiving a digital teeth model 200 (FIG. 2) of a set of physical teeth 100 (FIG. 1) of the patient that includes the adjacent physical teeth 100b, 100c (FIG. 1). The digital teeth model 200 (FIG. 2) can be obtained from a digital scan as described above of the set of physical teeth 100 (FIG. 1).

The digital-tooth-model-creation-component 730 is configured for creating one or more digital tooth models 600a-600d (FIG. 6) that more accurately depicts one or more of the physical teeth 100 (FIG. 1) than corresponding digital teeth 200a-200d (FIG. 2) included in the digital teeth model 200 (FIG. 2) based on the interproximal information.

The digital-tooth-model-creation-component 730 may be further configured for creating digital tooth models 600b, 600c (FIG. 6) representing the adjacent physical teeth 100b, 100c (FIG. 1), which more accurately depict contours 130a, 130b (FIG. 1) of the adjacent physical teeth 100b, 100c (FIG. 1) in area 120 (FIG. 1) between the adjacent physical teeth 100b, 100c (FIG. 1), for creating a digital tooth model 600c (FIG. 6) that more accurately depicts a flattened surface of contour 130b of a physical tooth 100c (FIG. 1) due to interproximal reduction, or for creating a digital tooth model 600c (FIG. 6) based on information indicating that an interproximal reduction is planned to be or has been performed on at least one of the adjacent physical teeth 100b, 100c (FIG. 1), or a combination thereof.

The system 700 may also include a physical-tooth-specification-component 712 configured for receiving information specifying which of the set of physical teeth 100 (FIG. 1) the adjacent physical teeth 100b, 100c (FIG. 1) are. According to one embodiment, the information specifying which of the set of physical teeth 100 (FIG. 1) the adjacent physical teeth 100b, 100c (FIG. 1) are, is a part of the interproximal information and may be received by the interproximal-information-obtaining-component 710. The physical-tooth-specification-component 712 may be a part of the interproximal-information-obtaining-component 710 or may communicate with the interproximal-information-obtaining-component 710.

The system 700 can include one or more computer processors for performing the operations of receiving of the interproximal information, the receiving of the digital teeth model 200 (FIG. 2) and the creating of the one or more digital tooth models 600 (FIG. 6).

Figure 8:
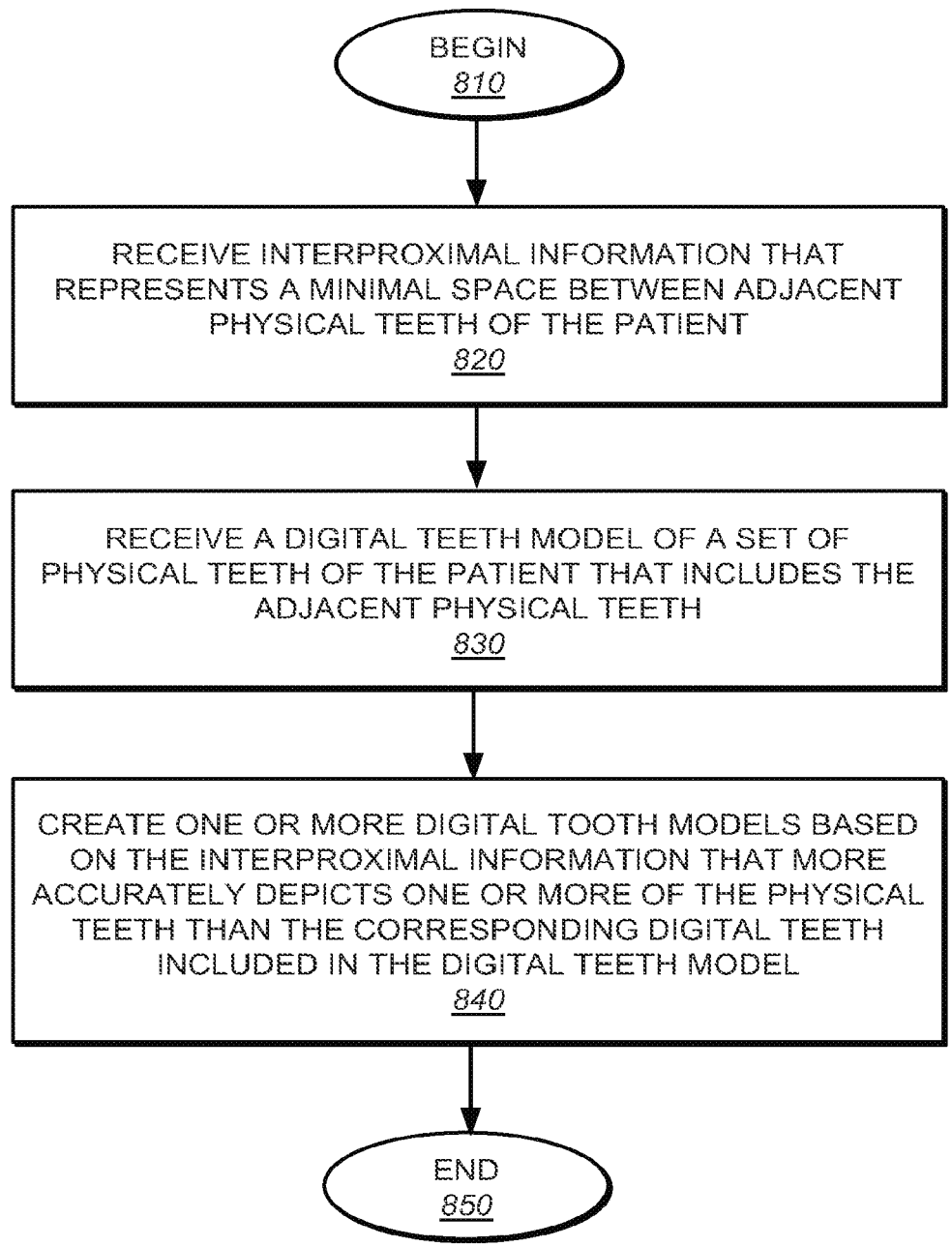
FIG. 8 illustrates a method of creating a digital tooth model of a patient's tooth using interproximal information, according to one embodiment.

FIG. 8 illustrates a method of creating a digital tooth model of a patient's tooth using interproximal information, according to one embodiment.

At 810, the method begins.

At 820, interproximal information is received that represents a space 110 (FIG. 1) between adjacent physical teeth 100b, 100c (FIG. 1) of the patient. For example, an instrument 400 (FIG. 4) can be inserted between the adjacent physical teeth 100b, 100c (FIG. 1). Several instruments 400 of different known widths can be used. When the appropriate amount resistance results from the insertion of a particular instrument 400, the width of that instrument 400 can be used as the interproximal space 110 (FIG. 1). Each of the instruments 400 may have a label or other indicia (such as numbers, shape, colors, letters, notches, etc.), including geometric indicia, specifying the thickness of each of the instruments 400.

The thickness associated with the instrument 400 that provides appropriate resistance can be entered into a user interface 500 (FIG. 5). Further, the adjacent physical teeth 100*b*, 100*c* (FIG. 1) can be specified by a user interface 500. The user interface 500 may be a part of a system that performs digital scans which may be used by a treating professional, lab, service provider or manufacturer.

Various embodiments are also well suited for receiving interproximal information that represents a space 110 obtained, at least in part, by inserting a scannable object (FIGS. 9*a*-9*f*) in the space 110, as described in the context of FIGS. 9*a*-10*c*.

According to one embodiment, information is received that specifies the adjacent physical teeth 100*b*, 100*c* (FIG. 1) with respect to other physical teeth 100*a*, 100*d* (FIG. 1) associated with the set of physical teeth 100 (FIG. 1). For example, the interproximal information can also include identification of the adjacent teeth 100*b*, 100*c* (FIG. 1) that were specified by circling 510 (FIG. 5) representations of teeth displayed on a user interface 500, identifications of the adjacent teeth 100*b*, 100*c* (FIG. 1), or names of the adjacent teeth 100*b*, 100*c* (FIG. 1), among other things.

The received interproximal information can represent a naturally occurring space 110 between the adjacent physical teeth 100*b*, 100*c* (FIG. 1) or an artificially created space 110 between the adjacent physical teeth 100*b*, 100*c* (FIG. 1).

Information can be received indicating that an interproximal reduction is planned to be or has been performed on at least one of the adjacent physical teeth 100*b*, 100*c* (FIG. 1). This information may be a part of or separate from the received interproximal information.

The interproximal information, according to one embodiment, is obtained prior to the segmentation process, for example, by a system that performs digital scans. The interproximal information may be communicated to an interproximal-information-obtaining-component 710 of the system 700 (FIG. 7). The system 700 may be a part of a segmentation system.

At 830, a digital teeth model 200 (FIG. 2) of a set of physical teeth 100 (FIG. 1) of the patient that includes the adjacent physical teeth 100*b*, 100*c* (FIG. 1) is received. For example, a digital teeth model 200 (FIG. 2) of a set of physical teeth 100 (FIG. 1) that includes adjacent physical teeth 100*b*, 100*c* (FIG. 1) can be received by a digital-teeth-model-receiving-component 720 of the system 700 (FIG. 7).

The received digital teeth model 200 (FIG. 2) can be derived from a digital scan of physical teeth 100 (FIG. 1), as described above. The interproximal information received at 820 may be included in a digital teeth model 200 (FIG. 2) that is received at 830.

At 840, one or more digital tooth models 600 (FIG. 6) is created that more accurately depicts one or more of the physical teeth 100*a*-100*d* (FIG. 1) than corresponding digital teeth 200*a*-200*d* (FIG. 2) included in the digital teeth model 200 (FIG. 2) based on the interproximal information. For example, one or more digital tooth models 600*a*-600*d* (FIG. 6) can be created by a digital-tooth-model-creation-component 730 of the system 700 (FIG. 7). The digital tooth models 600 (FIG. 6) can be created based on the interproximal information that represents the space 110 (FIG. 1) between the adjacent physical teeth 100*b*, 100*c* (FIG. 1) that correspond to the digital tooth models 600*b*, 600*c* (FIG. 6).

The digital tooth models 600*b*, 600*c* (FIG. 6) more accurately depict the adjacent physical teeth 100*b*, 100*c* (FIG. 1) than the digital teeth 200*b*, 200*c* (FIG. 2) in the digital teeth model 200 (FIG. 2) due to being created based on the interproximal information, according to one embodiment. For example, since the interproximal space 110 (FIG. 1) between the adjacent physical teeth 100*b*, 100*c* (FIG. 1) may be too small for a digital scan to recognize, the interproximal space 110 is not properly/accurately depicted between the adjacent digital teeth 200*b*, 200*c* (FIG. 2) in the digital teeth model 200 (FIG. 2). The area associated with the interproximal space 110 between the adjacent digital teeth 200*b*, 200*c* (FIG. 2) may be, at least partially, connected with some holes 220. When a conventional 3D virtual model 300 (FIG. 3) is created from the digital teeth model 200, the holes 220 (FIG. 2) in the digital teeth model 200 may be filled causing the adjacent digital teeth 300*b*, 300*c* (FIG. 3) in the conventional 3D virtual model 300 (FIG. 3) to be connected in the vicinity of the interproximal space 320 (FIG. 3). In contrast, according to various embodiments, interproximal information is obtained prior to or as part of performing the segmentation process on the digital teeth model 200 (FIG. 2) and can be used as a part of the segmentation process to maintain the interproximal space 110 (FIG. 1) as depicted at interproximal space 610 (FIG. 6) between respectively created digital tooth models 600*b*, 600*c* (FIG. 6). According to one embodiment, the interproximal space 610 is an interproximal space model.

Further, the exemplary created digital tooth models 600 (FIG. 6) can more accurately depict naturally occurring or, at least partially created, contours of the area of the adjacent physical teeth. Assume for the sake of illustration that contours 630*a*, 630*b* (FIG. 6) correspond to contours 130*a*, 130*b* (FIG. 1) and that area 620 (FIG. 6) corresponds to area 120 (FIG. 1). In this case, the contours 630*a*, 630*b* (FIG. 6) of the digital tooth models 600*b*, 600*c* (FIG. 6) can more accurately depict the contours 130*a*, 130*b* (FIG. 1) of the interproximal area 120 (FIG. 1) than corresponding surfaces associated with corresponding digital teeth 300*b*, 300*c* (FIG. 3) of the conventional 3D virtual model 300 (FIG. 3).

The digital tooth model 600*c* (FIG. 6) can more accurately depict the flattened surface of the corresponding physical tooth that was caused by interproximal reduction on that physical tooth. Assume for the sake of illustration that the flattened surface associated with contour 630*b* (FIG. 6) of digital model 600*c* (FIG. 6) corresponds to the flattened surface associated with contour 130*b* (FIG. 1) of the physical tooth 100*c* (FIG. 1). In this case, the flattened surface of the digital tooth model 600*c* (FIG. 6) can more accurately depict the flattened surface of the physical tooth 100*c* (FIG. 1) than a corresponding surface of digital tooth 300*c* (FIG. 3) of the conventional 3D virtual model 300 (FIG. 3).

At 850, the method ends.

The receiving of the interproximal information at 820, the receiving of the digital teeth model at 830 and the creating of the one or more digital tooth models at 840 can be performed, for example, by one or more computer processors associated with a system 700 (FIG. 7).

According to one embodiment, a dental appliance or a series of dental appliances can be fabricated based on the digital tooth models 600 (FIG. 6) that more accurately depict the patient's physical teeth 100 (FIG. 1) based on the interproximal information. A dental appliance or a series of dental appliances that more accurately depict the patient's physical teeth 100, according to various embodiments, can more successfully and more easily align teeth and may close or significantly reduce or enlarge, as desired, an interproximal space 110 (FIG. 1) between the patient's teeth 100b, 100c (FIG. 1).

According to one embodiment, a digital teeth model 200 (FIG. 2) is segmented into digital tooth models 600a-600d (FIG. 6) so that the digital tooth models 600a-600d can be used as a basis for the movement of corresponding physical teeth 100a-100d (FIG. 1) through the series of intermediate arrangements during the course of treatment. Each of the digital tooth models 600a-600d may have one or more axes of its own and three dimensional (3D) coordinates so that each of the digital tooth models' 600a-600d can be freely positioned in 3D space based on the position of a corresponding physical tooth 100a-100d at a given point in time. The 3D coordinates alone or 3D coordinates in combination with one or more axes of each of the digital tooth models 600a-600d can be used to match or closely approximate the position of each of the corresponding physical teeth 100a-100d. Intermediate and final aligners can be fabricated based on each of the series of intermediate and final arrangements.

Figure 11:
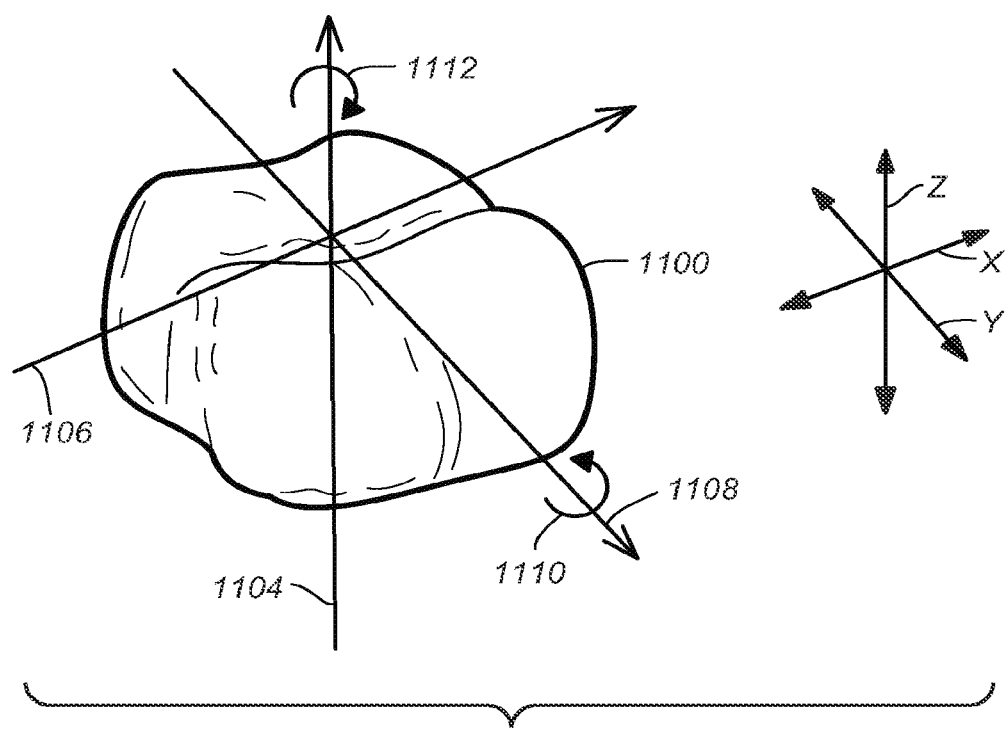
FIG. 11 depicts a digital tooth that represents one tooth that may be used to match or closely approximate the position of a corresponding tooth, according to one embodiment.

For example, FIG. 11 depicts one tooth 1100 that may be used to match or closely approximate the position of a corresponding tooth, according to one embodiment. According to one embodiment, the digital tooth 1100 represents a segmented or partially segmented digital tooth, that has one or more axes and three dimensional (3D) coordinates so that the digital tooth 1100 can be freely positioned in 3D space. For example, the 3D coordinates x, y, and z alone or 3D coordinates x, y, and z in combination with one or more axes 1104, 1106, 1108 can be used for positioning the digital tooth 1100.

As a frame of reference describing how a digital tooth 1100 may be moved, an arbitrary centerline (CL) may be drawn through the digital tooth 1600. With reference to this centerline (CL), a tooth 1100 may be moved in orthogonal directions represented by axes 1104, 1106, and 1108 (where 1104 is the centerline). The centerline may be rotated about the axis 1108 (root angulation) and the axis 1104 (torque) as indicated by arrows 1110 and 1112, respectively. Additionally, the tooth 1100 may be rotated about the centerline, as represented by an arrow 1112. Thus, all possible free-form motions of the tooth 1100 can be performed.

Although specific operations are disclosed in flowchart 800, such operations are exemplary. That is, embodiments of the present invention are well suited to performing various other operations or variations of the operations recited in flowchart 800. It is appreciated that the operations in flowchart 800 can be performed in an order different than presented, and that not all of the operations in flowchart 800 can be performed.

The above illustration is only provided by way of example and not by way of limitation. There are other ways of performing the method described by flowchart 800.

Figure 12A:
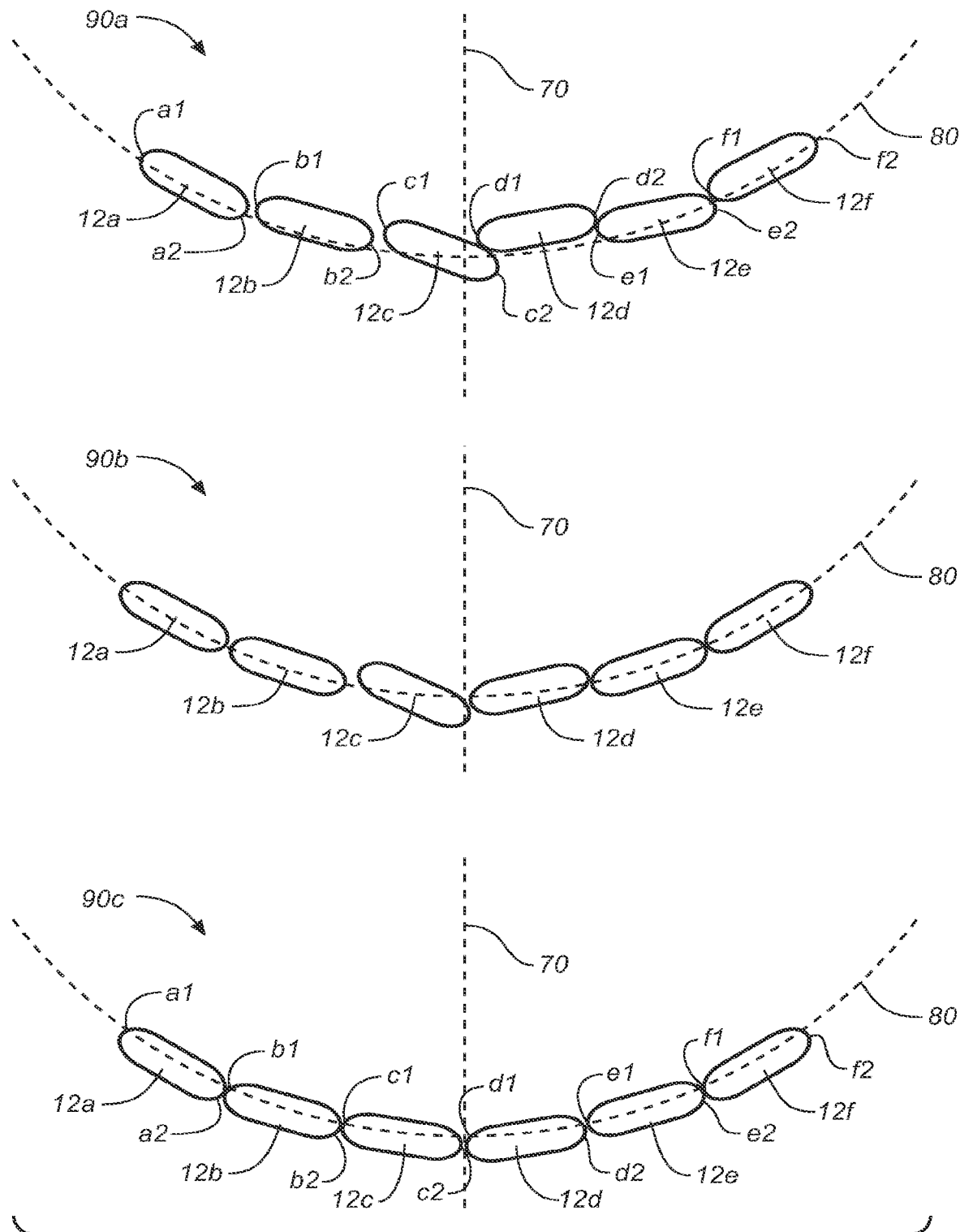
FIGS. 12A and 12B depict an example of a patient's physical teeth at various stages of position as a part of performing interproximal reduction, according to various embodiments.
Figure 12B:
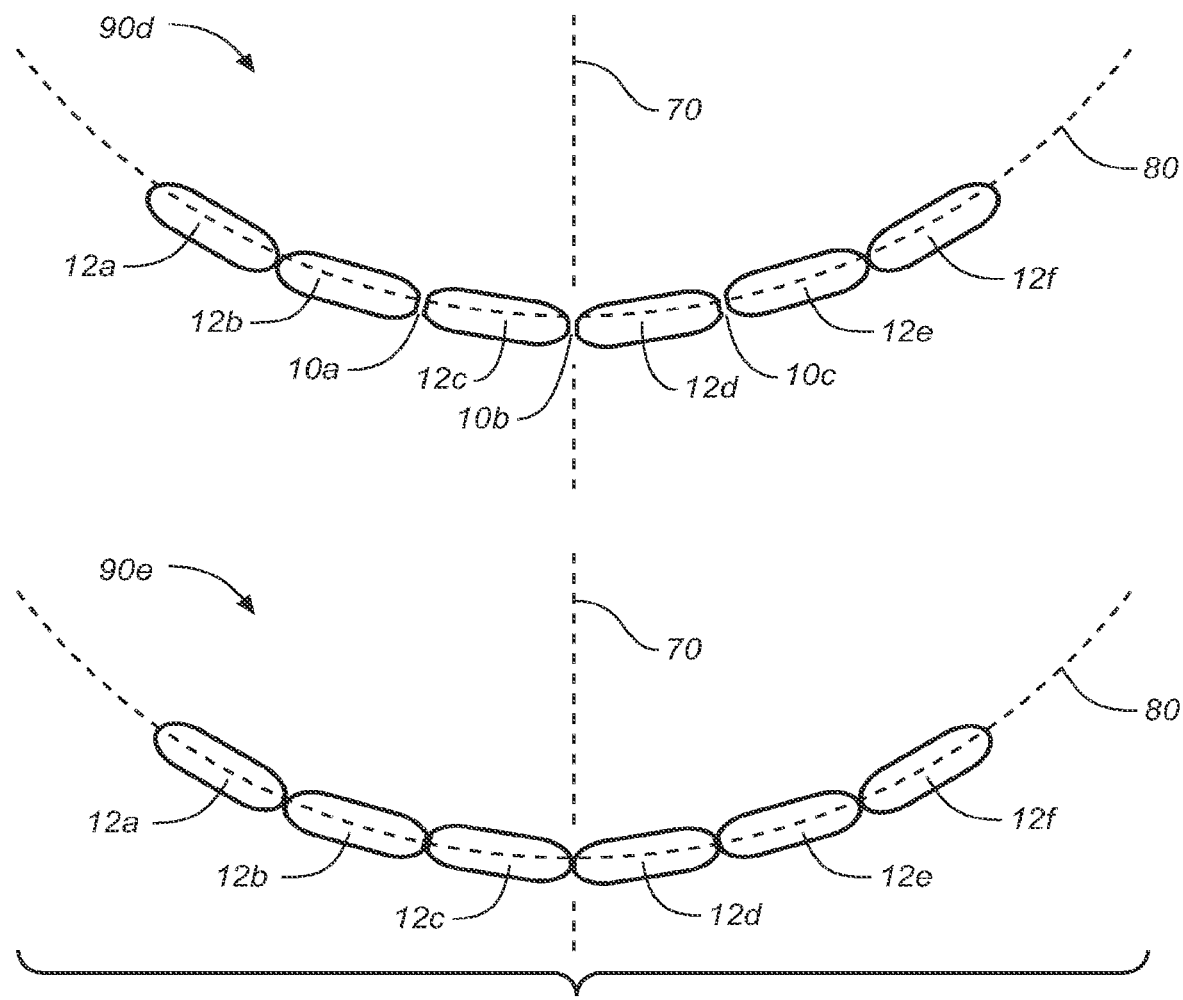

FIGS. 12A and 12B depict an example of a patient's physical teeth at various stages of position as a part of performing interproximal reduction, according to various embodiments. Interproximal reduction can be used to avoid moving physical teeth along the arch to create space for other teeth to move (also referred to as "distillization") or extraction of one or more physical teeth.

The patient's set of physical teeth include physical teeth 12a-12f. Each physical tooth 12a-12f has a distal and a mesial surface. For example, physical tooth 12a has a distal surface a1 and mesial surface a2, physical tooth 12b has a distal surface b1 and mesial surface b2, physical tooth 12c has a distal surface c1 and mesial surface c2, physical tooth 12d has a distal surface d1 and mesial surface d2, and physical tooth 12e has a distal surface e1 and mesial surface e2.

The physical teeth 12a-12f are depicted at five different stages 90a-90e of position. The patient's set of physical teeth 12a-12f are depicted in relationship to the arch 80 and medial axis 70 of the patient's jaw at each stage 90a-90e.

At the initial stage 90a of alignment, the physical teeth 12b, 12c, 12d are overlapping. More specifically, the mesial surface b2 of physical tooth 12b is in front of the distal surface c1 of physical tooth 12c, the mesial surface c2 of physical tooth 12c is in front of the distal surface d1 of physical tooth 12d.

At stage 90b, physical teeth 12c, 12d are moved outwards to remove the overlapping of the physical teeth 12b, 12c, 12d. As depicted, the physical teeth 12c, 12d are moved by tilting them toward the patient's lips.

At stage 90c, physical teeth 12c, 12d are rotated to orient the mesial surface and distal surface of adjacent physical teeth 12b, 12c, 12d, 12e in preparation of interproximal reduction at locations 60a, 60b, and 60c. More specifically as depicted in this illustration, the physical teeth 12c, 12d are rotated to orient mesial surface b2 toward the distal surface c1 for adjacent physical teeth 12b, 12c, the mesial surface c2 toward the distal surface d1 for adjacent physical teeth 12c, 12d, and the mesial surface d2 toward the distal surface e1 for adjacent physical teeth 12d, 12e. As can be seen, the physical teeth 12b, 12c, 12d, 12e are slightly forward of the arch 80 at stage 90c because the physical teeth 12b, 12c, 12d, 12e are still too large to be moved back into the arch 80.

According to one embodiment, interproximal reduction can be performed at locations 60a, 60b, and 60c resulting in interproximal spaces 10a, 10b, 10c as depicted in stage 90d. The positions of the physical teeth 12a-12f are the same in stages 90c and 90d. The interproximal spaces 10a, 10b, 10c provide sufficient room to move the physical teeth 12b, 12c, 12d, 12e into the arch 80 and to properly align each of the physical teeth 12a-12f with respect to each other as depicted in stage 90e.

Various embodiments provide for correcting scan data of physical teeth in a current position to better represent contours of physical teeth in the vicinity of an interproximal space for treatment and possibly for performing interproximal reduction. For example, referring to stage 90a using a conventional method, the triangular areas between respective overlapping adjacent physical teeth 12b, 12c, 12d may be filled with data. Further, the contours of the triangular areas on the lingual side may appear to be closer to the tongue than is the case in reality and the contours of the triangular areas on the buccal side may appear to be closer to the lips than is the case in reality. Further, the interproximal spaces between the physical teeth 12a, 12b and 12d and 12e may be filled in resulting in adjacent physical teeth 12a, 12b and adjacent physical teeth 12d and 12e appearing to be connected.

In contrast, using various embodiments, various scannable objects as depicted in FIGS. 9a-9f, can be inserted into the interproximal spaces between adjacent physical teeth and a digital scan can be taken. For example, a scannable object may be inserted between physical teeth 12c and 12d. Due to the overlap of the adjacent physical teeth 12c and 12d, the scannable object may lay in an approximately flat position on the buccal surface between physical teeth 12c and 12d. The scannable object can be used as a part of extrapolating contours associated with the physical teeth 12c and 12d as discussed herein. Similarly, scannable objects can be inserted between other adjacent physical teeth depicted in FIGS. 12A and 12B. Although the use of various embodiments to better represent contours of physical teeth in the vicinity of an interproximal space have been discussed in the context of physical teeth 12a-12f at stage 90a, various embodiments are well suited for better representation of contours of physical teeth at other stages 90b-90e.

Thus, various embodiments can be used for correcting digital scan data of physical teeth in a current position to better represent contours of physical teeth in the vicinity of an interproximal space between those physical teeth.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present invention are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present invention. According to one embodiment, the non-transitory computer readable storage medium is tangible.

According to one embodiment, a non-transitory computer readable storage medium having computer-executable instructions stored thereon for causing a computer system to perform a method of creating a digital tooth model of a patient's tooth using interproximal information is provided. For example, interproximal information is received that represents a space 110 (FIG. 1) between adjacent physical teeth 100b, 100c (FIG. 1) associated with a set of physical teeth 100 (FIG. 1). The space 110 can be a naturally occurring space between the adjacent physical teeth or an artificially created space. Interproximal information can be determined by manually inserting pieces of material, which each have a different thickness, between the adjacent physical teeth 100b, 100c (FIG. 4). User specified information specifying the adjacent physical teeth 100b, 100c (FIG. 1) with respect to other physical teeth 100a, 100d (FIG. 1) associated with the set of physical teeth 100 (FIG. 1) can be received. The received user specified information can be specified by a circle 510 (FIG. 5) around visual representations of the adjacent physical teeth 100b, 100c (FIG. 1), identification information of the adjacent physical teeth 100b, 100c (FIG. 1), or locations of the adjacent physical teeth 100b, 100c (FIG. 1), or a combination thereof.

Further, according to one embodiment, the non-transitory computer readable storage medium provides for the creation of digital tooth models 600b, 600c (FIG. 6) that more accurately depict the adjacent physical teeth 100b, 100c (FIG. 1) than corresponding digital teeth 200b, 200c (FIG. 2) included in a digital teeth model 200 (FIG. 2) based on the interproximal information, according to one embodiment. For example, one or more digital tooth models 600 (FIG. 6) can be created that include adjacent digital tooth models 600b, 600c (FIG. 6) that more accurately depict contours 130a, 130b (FIG. 1) of the adjacent physical teeth 100b, 100c (FIG. 1). An area associated with the interproximal space 110 (FIG. 2) of the digital teeth model 200 (FIG. 2) that corresponds to the space 110 (FIG. 1) between the adjacent physical teeth 100b, 100c (FIG. 1) can be identified and a digital tooth model 600b, 600c (FIG. 6) can be created that represents one of the adjacent physical teeth 100b, 100c (FIG. 1) by preventing the digital tooth model 600b, 600c (FIG. 6) from extending into an area 610 (FIG. 6).

Creating digital tooth models 600 (FIG. 6) of a patient's teeth 100 (FIG. 1) using interproximal information which enables more accurate digital tooth models at least provides, for example, improved fitting dental appliance, improved treatment outcome, improved closure or opening of interproximal spaces, more confidence for the dental personnel, and the ability to better track interproximal space closure from a research and development stand point.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of generating a digital dental model of a patient's teeth, the method comprising:
   receiving, by a digital-teeth-model-receiving-component, a first digital scan of the patient's teeth, wherein the first digital scan comprises a first three-dimensional digital teeth model;
   receiving, by the digital-teeth-model-receiving-component, a second digital scan of the patient's teeth, wherein the second digital scan comprises a scannable object inserted in an interproximal space between a first tooth and a second tooth of the patient's teeth, wherein dimensions of the interproximal space cannot be determined from the first digital scan;
   determining, by an interproximal-information-obtaining-component, interproximal information of the patient's teeth, wherein the interproximal information is based at least in part on the second digital scan, and wherein the interproximal information comprises a distance of the interproximal space between the first tooth and the second tooth of the patient's teeth; and
   generating, by a digital-teeth-model-creation-component, a modified three-dimensional digital teeth model based at least in part on the first three-dimensional digital teeth model and the interproximal information,
   wherein the modified three-dimensional digital teeth model is generated by digitally removing, from the first three-dimensional digital teeth model, three-dimensional model portions corresponding to the interproximal space between the first tooth and the second tooth of the patient, thereby providing a depiction of the interproximal space between the first tooth and the second tooth of the patient's teeth.

2. The method of generating the digital dental model of claim 1, wherein the scannable object comprises a known thickness.

3. The method of generating the digital dental model of claim 1, wherein the scannable object comprises indicia to determine the distance of the interproximal space between the first tooth and the second tooth of the patient's teeth.

4. The method of generating the digital dental model of claim 1, wherein the interproximal information is based at least in part on information received through a user interface.

5. The method of generating the digital dental model of claim 4, wherein the user interface is configured to receive an input from a dental personnel related to the distance of the interproximal space between the first tooth and the second tooth of the patient's teeth.

6. The method of generating the digital dental model of claim 4, wherein the user interface is configured to provide a visual representation of the interproximal space between the first tooth and the second tooth of the patient's teeth.

7. The method of generating the digital dental model of claim 1, the method further comprising receiving information indicating that interproximal reduction is planned to be or has been performed on the first tooth and the second tooth of the patient's teeth.

8. The method of generating the digital dental model of claim 1, wherein generating the modified three-dimensional digital teeth model comprises segmenting the first three-dimensional digital teeth model based at least in part on the interproximal information.

9. The method of generating the digital dental model of claim 8, wherein the modified three-dimensional digital teeth model comprises a plurality of digital tooth models.

10. The method of generating the digital dental model of claim 1, wherein generating the modified three-dimensional digital teeth model comprises depicting contours of areas between the first tooth and the second tooth of the patient's teeth.

11. The method of generating the digital dental model of claim 1, wherein the interproximal information represents a naturally occurring interproximal space between the first tooth and the second tooth of the patient's teeth.

12. The method of generating the digital dental model of claim 1, wherein the interproximal information represents an artificially created interproximal space between the first tooth and the second tooth of the patient's teeth.

13. The method of generating the digital dental model of claim 1, wherein the modified three-dimensional digital teeth model comprises one or more flattened surfaces for representing at least a portion of the first tooth or the second tooth near the interproximal space.

14. A system for creating a digital dental model of a patient's teeth, the system comprising:

a digital-teeth-model-receiving-component, wherein the digital-teeth-model-receiving-component is configured to receive 1) a first digital scan of the patient's teeth, wherein the first digital scan comprises a first three-dimensional digital teeth model, and 2) a second digital scan of the patient's teeth, wherein the second digital scan comprises a scannable object inserted in an interproximal space between a first tooth and a second tooth of the patient's teeth, wherein dimensions of the interproximal space cannot be determined from the first digital scan;

an interproximal-information-obtaining-component in association with the digital-teeth-model-receiving-component, wherein the interproximal-information-obtaining-component is configured to determine interproximal information of the patient's teeth, wherein the interproximal information is based at least in part on the second digital scan, and wherein the interproximal information comprises a distance of the interproximal space between the first tooth and the second tooth of the patient's teeth;

a digital-teeth-model-creation-component in association with the digital-teeth-model-receiving-component and the interproximal-information-obtaining-component, wherein the digital-teeth-model-creation-component is configured to generate a modified three-dimensional digital teeth model based at least in part on the first three-dimensional digital teeth model and the interproximal information, wherein the modified three-dimensional digital teeth model is generated by digitally removing, from the first three-dimensional digital teeth model, three-dimensional model portions corresponding to the interproximal space between the first tooth and the second tooth of the patient, thereby providing a depiction of the interproximal space between the first tooth and the second tooth of the patient's teeth.

15. The system for creating the digital dental model of claim 14, wherein the scannable object comprises a known thickness.

16. The system for creating the digital dental model of claim 14, wherein the scannable object comprises indicia to determine the distance of the interproximal space between the first tooth and the second tooth of the patient's teeth.

17. The system for creating the digital dental model of claim 14, the system further comprising a user interface, wherein the interproximal information is based at least in part on information received through the user interface.

18. The system for creating the digital dental model of claim 17, wherein the user interface is configured to receive an input from a dental personnel related to the distance of the interproximal space between the first tooth and the second tooth of the patient's teeth.

19. The system for creating the digital dental model of claim 17, wherein the user interface is configured to provide a visual representation of the interproximal space between the first tooth and the second tooth of the patient's teeth.

20. The system for creating the digital dental model of claim 14, wherein the system is configured to receive information indicating that interproximal reduction is planned to be or has been performed on the first tooth and the second tooth of the patient's teeth.

21. The system for creating the digital dental model of claim 14, wherein the digital-teeth-model-creation-component is further configured to segment the first three-dimensional digital teeth model based at least in part on the interproximal information.

22. The system for creating the digital dental model of claim 21, wherein the modified three-dimensional digital teeth model comprises a plurality of digital tooth models.

23. The system for creating the digital dental model of claim 14, wherein the digital-teeth-model-creation-component is further configured to depict contours of areas between the first tooth and the second tooth of the patient's teeth.

24. The system for creating the digital dental model of claim 14, wherein the interproximal information represents a naturally occurring interproximal space between the first tooth and the second tooth of the patient's teeth.

25. The system for creating the digital dental model of claim 14, wherein the interproximal information represents an artificially created interproximal space between the first tooth and the second tooth of the patient's teeth.

26. The system for creating the digital dental model of claim 14, wherein the modified three-dimensional digital teeth model comprises one or more flattened surfaces for representing at least a portion of the first tooth or the second tooth near the interproximal space.

* * * * *